United States Patent
Boisvert et al.

(10) Patent No.: US 11,685,982 B2
(45) Date of Patent: Jun. 27, 2023

(54) FREE GRAPHITE CONTAINING POWDERS

(71) Applicants: FEDERAL-MOGUL LLC, Southfield, MI (US); LA CORPORATION DE L'ECOLE POLYTECHNIQUE DE MONTREAL, Montreal (CA)

(72) Inventors: Mathieu Boisvert, Waupun, WI (US); Gilles L'Esperance, Candiac (CA); Philippe Beaulieu, Coventry (GB); Denis B. Christopherson, Jr., Waupun, WI (US)

(73) Assignees: Tenneco Inc., Lake Forest, IL (US); Le Corporation de L'Ecole Polytechnique De Montreal, Montreal (CA)

( * ) Notice: Subject to any disclaimer, the term of this patent is extended or adjusted under 35 U.S.C. 154(b) by 114 days.

(21) Appl. No.: 15/784,587

(22) Filed: Oct. 16, 2017

(65) Prior Publication Data

US 2018/0105906 A1 Apr. 19, 2018

Related U.S. Application Data

(60) Provisional application No. 62/409,244, filed on Oct. 17, 2016.

(51) Int. Cl.
C22C 38/54 (2006.01)
C22C 33/02 (2006.01)
(Continued)

(52) U.S. Cl.
CPC ............ *C22C 38/54* (2013.01); *B22F 3/1035* (2013.01); *B22F 9/082* (2013.01);
(Continued)

(58) Field of Classification Search
None
See application file for complete search history.

(56) References Cited

U.S. PATENT DOCUMENTS 3,977,867 A 8/1976 Cochran et al.
4,342,588 A 8/1982 Sporrong et al.
(Continued)

FOREIGN PATENT DOCUMENTS

CN 1282641 A 2/2001
CN 101107376 A 1/2008
(Continued)

OTHER PUBLICATIONS

English machine translation of JP H06-322470, EPO, accessed Aug. 16, 2019.*
(Continued)

*Primary Examiner* — Xiaobei Wang
(74) *Attorney, Agent, or Firm* — Robert L. Stearns; Dickinson Wright, PLLC

(57) ABSTRACT

An improved atomized powder metal material containing an increased amount of free graphite after heat treatment and/or sintering is provided. The powder metal material is typically a ferrous alloy and includes carbon in an amount of 1.0 wt. % to 6.5 wt. % and silicon in an amount of 0.1 wt. % to 6.0 wt. %, based on the total weight of the powder metal material. The powder metal material can also include various other alloying elements, for example at least one of nickel (Ni), cobalt (Co), copper (Cu), tin (Sn), aluminum (Al), sulfur (S), phosphorous (P), boron (B), nitrogen (N), chromium (Cr), manganese (Mn), molybdenum (Mo), vanadium (V), niobium (Nb), tungsten (W), titanium (Ti), tantalum (Ta) zirconium (Zr), zinc (Zn), strontium (Sr), calcium (Ca), barium (Ba) magnesium (Mg), lithium (Li), sodium (Na), and potassium (K).

11 Claims, 24 Drawing Sheets

| Elements | Free Graphite Alloy Powder |
|---|---|
| C | 1.0 to 6.5% |
| Si | 0.1% to 6.0% |
| Fe | Bal. |
| Ni | 0 to 49% |
| Co | 0 to 35% |
| Cu | 0 to 40% |
| Sn | 0 to 25% |
| Al | 0 to 10% |
| S | 0 to 2.0% |
| P | 0 to 2.0% |
| B | 0 to 1.0% |
| N | 0 to 1.0% |
| Cr | 0 to 40% |
| Mn | 0 to 25% |
| Mo | 0 to 7.0% |
| V | 0 to 10.0% |
| Nb | 0 to 10.0% |
| W | 0 to 10.0% |
| Ti | 0 to 10.0% |
| Ta | 0 to 10.0% |
| Zr | 0 to 10.0% |
| K/Na/Zn/Mg/Li/Sr/Ca/Ba | 0 to 1.0% each |

(51) Int. Cl.

| | | |
|---|---|---|
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *B22F 1/00* | (2022.01) | |
| *B22F 3/10* | (2006.01) | |
| *B22F 9/08* | (2006.01) | |

(52) U.S. Cl.
CPC ........ *C22C 33/0257* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *B22F 1/00* (2013.01); *B22F 2301/35* (2013.01); *B22F 2998/10* (2013.01)

(56) References Cited

U.S. PATENT DOCUMENTS

| | | | |
|---|---|---|---|
| 4,401,469 A | 8/1983 | Rehder | |
| 6,358,298 B1* | 3/2002 | Gagne | B22F 3/1028 419/11 |
| 6,482,354 B1* | 11/2002 | Wert | C22C 38/42 420/10 |
| 6,599,345 B2 | 7/2003 | Wang et al. | |
| 7,234,871 B2 | 6/2007 | Maruyama et al. | |
| 7,235,116 B2 | 6/2007 | Rodrigues et al. | |
| 9,255,575 B2 | 2/2016 | Stetina et al. | |
| 2002/0084004 A1* | 7/2002 | Takahashi | C22C 38/30 148/320 |
| 2004/0237715 A1* | 12/2004 | Rodrigues | C22C 33/0242 75/246 |
| 2006/0032328 A1 | 2/2006 | Chikahata et al. | |
| 2008/0146467 A1* | 6/2008 | Takayama | B22F 3/1035 508/105 |
| 2012/0177528 A1* | 7/2012 | Takayama | F16C 33/14 228/199 |
| 2013/0039796 A1* | 2/2013 | L'Esperance | C22C 33/02 419/11 |
| 2013/0089454 A1* | 4/2013 | Stetina | B22F 3/1035 418/179 |

FOREIGN PATENT DOCUMENTS

| | | | |
|---|---|---|---|
| CN | 102286702 A | * | 12/2011 |
| CN | 103537678 | * | 1/2014 |
| CN | 103589960 A | * | 2/2014 |
| CN | 102286702 | * | 6/2016 |
| EP | 1398391 A2 | | 3/2004 |
| JP | S5983701 A | | 5/1984 |
| JP | S62-124256 | * | 6/1987 |
| JP | H02-107742 | * | 4/1990 |
| JP | H059501 A | | 1/1993 |
| JP | H06256802 A | | 9/1994 |
| JP | H06322470 A | | 11/1994 |
| JP | 3221192 B2 | | 10/2001 |
| WO | 2006080554 A1 | | 8/2006 |

OTHER PUBLICATIONS

English machine translation of JP H07-118817, EPO, accessed Aug. 16, 2019.*

International Search Report, dated Jan. 22, 2018 (PCT/US2017/056895).

* cited by examiner

| Elements | Free Graphite Alloy Powder |
|---|---|
| C | 1.0 to 6.5% |
| Si | 0.1% to 6.0% |
| Fe | Bal. |
| Ni | 0 to 49% |
| Co | 0 to 35% |
| Cu | 0 to 40% |
| Sn | 0 to 25% |
| Al | 0 to 10% |
| S | 0 to 2.0% |
| P | 0 to 2.0% |
| B | 0 to 1.0% |
| N | 0 to 1.0% |
| Cr | 0 to 40% |
| Mn | 0 to 25% |
| Mo | 0 to 7.0% |
| V | 0 to 10.0% |
| Nb | 0 to 10.0% |
| W | 0 to 10.0% |
| Ti | 0 to 10.0% |
| Ta | 0 to 10.0% |
| Zr | 0 to 10.0% |
| K/Na/Zn/Mg/Li/Sr/Ca/Ba | 0 to 1.0% each |

FIG. 1

| Area#1 | Range#1 | Range#2 | Range#3 | Range#4 | Range#5 | Range#6 | Range#7 | Specific |
|---|---|---|---|---|---|---|---|---|
| C | [1,2] | [1.1,2] | [1.2,1.9] | [1.2,1.8] | [1.3,1.7] | [1.35,1.65] | [1.4,1.6] | 1.5 |
| Si | [0,1.6] | [0,2.5] | [0,75.3] | [0,75.2] | [0.75,1.5] | [1.0,1.5] | [1.0,1.3] | 1.0 |
| Ni | [0,47] | [0,25] | [0,15] | [0,10] | [0,8] | [1,6] | [1.5,4] | 2.0 |
| Co | [0,47] | [0,35] | [0,20] | [0,15] | [0,10] | [0,5] | [1.0,4] | 3.0 |
| Cu | [0,40] | [0,30] | [0,20] | [0,15] | [0,10] | [0,5] | [1.0,5] | 1.0 |
| Sn | [0,15] | [0,10] | [0,5] | [0,2] | [0.5,1.5] | | | 2.0 |
| Al | [0,10] | [0,8] | [0,5] | [0,2] | [0.5,1] | | | 0.75 |
| S | [0.2,0] | [0,15] | [0,0.6] | [0.05,0.3] | | | | 0.05 |
| P | [0.2,0] | [0,15] | [0,1.0] | [0.05,0.4] | | | | 0.05 |
| B | [0,1.0] | [0,0.6] | [0,0.3] | [0,0.1] | | | | 0.005 |
| N | [0,1.0] | [0,0.6] | [0,0.3] | [0,0.1] | | | | 0.005 |
| Cr | [0,10] | [0,8] | [0,6] | [0,5] | [0,2] | [0.2,1.5] | [0.5,1.0] | 0.50 |
| Mn | [0,10] | [0,6] | [0,3] | [0,1] | [0.2,0.8] | | | 0.5 |
| Mo | [0,10] | [0,8] | [0,6] | [0,5] | [0,2] | [0.2,1.5] | [0.5,1.0] | 0.50 |
| V | [0,7] | [0,5] | [0,3] | [0,2] | [0,2.2] | [0,2.1] | [0.3,0.8] | 0.3 |
| Nb | [0,7] | [0,5] | [0,3] | [0,2] | [0,2.2] | [0,2.1] | [0.3,0.8] | 0.3 |
| W | [0,20] | [0,15] | [0,10] | [0,7] | [0,5] | [0.5,4] | [0.5,2] | 1 |
| Ti | [0,10] | [0,6] | [0,3] | [0.5,1.5] | | | | 0.5 |
| Ta | [0,7] | [0,3] | [0,1] | [0.2,0.8] | | | | 0.3 |
| Zr | [0,7] | [0,3] | [0,1] | [0.2,0.8] | | | | 0.3 |
| K/Na/Zn/Mg/Li/Sr/Ca/Ba | [0,1] | [0,0.5] | [0,0.2] | | | | | 0.2 |

FIG. 3

| Area#2 | Range#1 | Range#2 | Range#3 | Range#4 | Range#5 | Range#6 | Range#7 | Specific |
|---|---|---|---|---|---|---|---|---|
| C | [2.0,5.0] | [2.0,4.8] | [2.0,4.5] | [2.2,4.3] | [2.5,4.0] | [2.5,3.5] | [3.0,3.5] | 3.5 |
| Si | [2.5,6] | [2.5,4.5] | [2.5,4.0] | [2.6,4.0] | [2.6,3.5] | [2.6,3.2] | [2.7,3.0] | 2.7 |
| Ni | [0,4.4] | [0,.25] | [0,.15] | [0,10] | [0,.8] | [1,6] | [1.5,4] | 2.0 |
| Co | [0,.44] | [0,.35] | [0,.20] | [0,.15] | [0,.10] | [0,.5] | [1.0,4] | 3.0 |
| Cu | [0,.40] | [0,.30] | [0,.20] | [0,.15] | [0,.10] | [0,.5] | [1.0,5] | 1.0 |
| Sn | [0,.15] | [0,.10] | [0,.5] | [0,.2] | [0.5,1.5] | | | 2.0 |
| Al | [0,.10] | [0,.8] | [0,.5] | [0,.2] | [0.5,1] | | | 0.75 |
| S | [0,.20] | [0,.15] | [0,.6] | [0.05,0.3] | | | | 0.05 |
| P | [0,.20] | [0,.15] | [0,.10] | [0.05,0.4] | | | | 0.05 |
| B | [0,.10] | [0,.6] | [0,.3] | [0,.1] | | | | 0.005 |
| N | [0,.10] | [0,.6] | [0,.3] | [0,.1] | | | | 0.005 |
| Cr | [0,.20] | [0,.15] | [0,.10] | [0,.6] | [0,.3] | [0,.1] | [0.2,0.8] | 0.5 |
| Mn | [0,.25] | [0,.15] | [0,.10] | [0,.6] | [0,.3] | [0,.1] | [0.2,0.8] | 0.5 |
| Mo | [0,.10] | [0,.8] | [0,.6] | [0,.5] | [0,.2] | [0.2,1.5] | [0.5,1.0] | 0.50 |
| V | [0,.10] | [0,.8] | [0,.6] | [0,.3] | [0.2,2] | [0.5,1.5] | [0.5,1.0] | 0.7 |
| Nb | [0,.10] | [0,.8] | [0,.6] | [0,.3] | [0.2,2] | [0.5,1.5] | [0.5,1.0] | 0.7 |
| W | [0,.20] | [0,.15] | [0,.10] | [0,.7] | [0,.5] | [0,.4] | [0,.5,2] | 1 |
| Ti | [0,.10] | [0,.6] | [0,.3] | [0.5,1.5] | [0.2,0.8] | | | 0.5 |
| Ta | [0,.10] | [0,.6] | [0,.3] | [0,.1] | [0.2,0.8] | | | 0.3 |
| Zr | [0,.10] | [0,.6] | [0,.3] | [0,.1] | | | | 0.3 |
| K/Na/Zn/Mg/Li/Sr/Ca/Ba | [0,1] | [0,0.5] | [0,0.2] | | | | | 0.2 |

FIG. 4

| Area#3 | Range#1 | Range#2 | Range#3 | Range#4 | Range#5 | Range#6 | Range#7 | Specific |
|---|---|---|---|---|---|---|---|---|
| C | [5.0,6.5] | [5.05,6.0] | [5.05,5.5] | [5.05,5.4] | [5.05,5.35] | [5.08,5.30] | | 5.1 |
| Si | [0,1.6] | [0,2.5] | [0.5,4] | [0.5,3.5] | [0.5,2.5] | [0.75,2.0] | [0.75,1.75] | 1.3 |
| Ni | [0,44] | [0,25] | [0,15] | [0,10] | [0,8] | [1,6] | [1.5,4] | 2.0 |
| Co | [0,44] | [0,35] | [0,20] | [0,15] | [0,10] | [0,5] | [1.0,4] | 3.0 |
| Cu | [0,40] | [0,30] | [0,20] | [0,15] | [0,10] | [0,5] | [1,0.5] | 1.0 |
| Sn | [0,15] | [0,10] | [0,5] | [0,2] | [0.5,1.5] | | | 2.0 |
| Al | [0,10] | [0,8] | [0,5] | [0,2] | [0.5,1] | | | 0.75 |
| S | [0,2.0] | [0,1.5] | [0,0.6] | [0.05,0.3] | | | | 0.05 |
| P | [0,2.0] | [0,1.5] | [0,1.0] | [0.05,0.4] | | | | 0.05 |
| B | [0,1.0] | [0,0.6] | [0,0.3] | [0,0.1] | | | | 0.005 |
| N | [0,1.0] | [0,0.6] | [0,0.3] | [0,0.1] | | | | 0.005 |
| Cr | [0,40] | [0,25] | [0,15] | [0,8] | [0,4] | [0.5,3] | [0.5,1.5] | 1 |
| Mn | [0,25] | [0,15] | [0,8] | [0,4] | [0.5,2] | | | 0.5 |
| Mo | [0,10] | [0,8] | [0,6] | [0,5] | [0,2] | [0.2,1.5] | [0.5,1.0] | 0.50 |
| V | [0,10] | [0,8] | [0,6] | [0,3] | [0,2.2] | [0.5,1.5] | [0.5,1.0] | 0.7 |
| Nb | [0,10] | [0,8] | [0,6] | [0,3] | [0,2.2] | [0.5,1.5] | [0.5,1.0] | 0.7 |
| W | [0,20] | [0,15] | [0,10] | [0,7] | [0,5] | [0.5,4] | [0.5,2] | 1 |
| Ti | [0,10] | [0,6] | [0,3] | [0.5,1.5] | | | | 0.5 |
| Ta | [0,10] | [0,6] | [0,3] | [0,1] | [0.2,0.8] | | | 0.3 |
| Zr | [0,10] | [0,6] | [0,3] | [0,1] | [0.2,0.8] | | | 0.3 |
| K/Na/Zn/Mg/Li/Sr/Ca/Ba | [0,1] | [0,0.5] | [0,0.2] | | | | | 0.2 |

FIG. 5

| Area#4 | Range#1 | Range#2 | Range#3 | Range#4 | Range#5 | Range#6 | Range#7 | Specific |
|---|---|---|---|---|---|---|---|---|
| C | [2.0,5.0] | [2.2,4.8] | [2.3,4.5] | [2.3,4.0] | [2.5,4.0] | [2.6,3.8] | [2.6,3.5] | 3 |
| Si | [0.1,2.5] | [0.5,2.5] | [0.5,2.3] | [0.5,2.0] | [0.75,2.0] | [1.0,2.0] | [1.2,1.8] | 1.5 |
| Ni | [4,46] | [4,35] | [4,25] | [5,20] | [5,15] | [5,10] | [7,13] | 7 |
| Co | [0.1,46] | [0.5,35] | [0.5,20] | [1.0,15] | [1.0,10] | [1.5,6] | [2,4.5] | 3.0 |
| Cu | [3,40] | [4,30] | [4,20] | [4,15] | [4,10] | [4,8] | [5,7] | 5.0 |
| Sn | [0.1,15] | [0.2,10] | [0.5,5] | [0.5,2] | [0.5,1.0] | | | 0.75 |
| Al | [0.1,10] | [0.5,8] | [0.5,5] | [0.5,2] | | | | 0.75 |
| S | [0.05,2.0] | [0.1,1.5] | [0.1,0.6] | [0.2,0.4] | | | | 0.3 |
| P | [1.0,2.0] | [1.0,1.5] | [1.1,1.4] | | | | | 1.25 |
| B | [0.20,1.0] | [0.20,0.40] | | | | | | 0.3 |
| N | [0.05,1.0] | [0.05,0.6] | [0.1,0.3] | | | | | 0.1 |
| Cr | [2,25] | [2,20] | [2,15] | [3,15] | [3,10] | [3,8] | [4,7] | 4 |
| Mn | [2,25] | [3,15] | [3,10] | [4,7] | | | | 4 |
| Mo | [4,10] | [4,8] | [4,6] | [4.5,6] | [4.5,5.5] | [4.5,5.0] | | 4.5 |
| V | [0.1,10] | [0.5,8] | [0.5,6] | [0.75,6] | [1,5] | [1,4] | [1.5,3.5] | 2 |
| Nb | [0.1,10] | [0.5,8] | [0.5,6] | [0.75,6] | [1,5] | [1,4] | [1.5,3.5] | 2 |
| W | [0.1,20] | [0.5,15] | [0.5,10] | [0.5,8] | [0.5,5] | [0.75,4] | [1.0,3.5] | 1 |
| Ti | [0.1,10] | [0.5,8] | [0.5,5] | [0.75,3.5] | | | | 0.75 |
| Ta | [0.1,10] | [0.5,8] | [0.5,5] | [0.75,3.5] | | | | 0.75 |
| Zr | [0.1,10] | [0.5,8] | [0.5,5] | [0.75,3.5] | | | | 0.75 |
| K/Na/Zn/Mg/Li/Sr/Ca/Ba | [0,1] | [0,0.5] | [0,0.2] | | | | | 0.2 |

FREE GRAPHITE CONTAINING POWDERS

CROSS REFERENCE TO RELATED APPLICATION

This U.S. utility patent application claims priority to U.S. provisional patent application no. 62/409,244, filed Oct. 17, 2016, the contents of which is incorporated herein by reference in its entirety.

BACKGROUND OF THE INVENTION

1. Field of the Invention

This invention relates generally to powder metal materials, sintered parts including the powder metal materials, and methods of forming the powder metal materials and sintered parts.

2. Related Art

Powder metal materials are oftentimes used to form parts with improved wear resistance and/or lubricity and/or machinability for automotive vehicle applications, such as valve guides, valve seat insert, gears and bushings. The powder metal material is typically formed by water or gas atomizing a melted metal material to form a plurality of atomized particles. The atomized particles could then be subjected to various treatments such as screening, milling, heat treatments, blending with other powders, consolidated/pressing, printed (additive manufacturing) and sintering to form the part with improved properties.

In the powder metal industry, efforts have been made to obtain free graphite in the parts after sintering. The free graphite can provide several benefits, such as improved wear resistance by lubrication, enhanced machinability, and light weight. The free graphite can also provide potential for large densification through supersolidus liquid phase sintering and to provide the possibility of a high relative density after sintering. However, the task of obtaining free graphite is not easy, since most powder metal parts are made of ferrous alloys, and because carbon, the main element of graphite, is significantly soluble in iron at high temperatures and will easily form carbides during cooling.

SUMMARY OF THE INVENTION

One aspect of the invention provides an improved powder metal material containing free graphite. The powder metal material is typically a ferrous alloy, but could be another iron, nickel, and/or cobalt based material. The powder metal material includes carbon in an amount of 1.0 wt. % to 6.5 wt. % and silicon in an amount of 0.1 wt. % to 6.0 wt. %, based on the total weight of the powder metal material. The powder metal material can also include various other alloying elements, for example at least one of nickel (Ni), cobalt (Co), copper (Cu), tin (Sn), aluminum (Al), sulfur (S), phosphorous (P), boron (B), nitrogen (N), chromium (Cr), manganese (Mn), molybdenum (Mo), vanadium (V), niobium (Nb), tungsten (W), titanium (Ti), tantalum (Ta) zirconium (Zr), zinc (Zn), strontium (Sr), calcium (Ca), barium (Ba) magnesium (Mg), lithium (Li), sodium (Na), and potassium (K). The powder metal material is also atomized and includes free graphite.

Another aspect of the invention provides a method of manufacturing the powder metal material. The method includes water or gas atomizing a melt, but other powder manufacturing processes could be used, for example plasma atomization and rotating disk atomization, to form a plurality of atomized particles, also referred to as the powder metal material. The method preferably includes heat treating the atomized particles to increase the amount of free graphite present in the material.

Another aspect of the invention provides a sintered part formed of the powder metal material, and a method of manufacturing the sintered part.

The free graphite present in the powder metal material provides enhanced machinability, reduced weight, and the possibility for high density after sintering. In addition, sintered parts formed from the powder metal material, such as valve guides, have improved wear resistance due to the increased lubrication provided by the free graphite.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 includes a Table providing an overview of possible compositions of a powder metal material;

FIG. 3 lists the preferred ranges of each element present in the powder metal material of Area #1;

FIG. 4 lists the preferred ranges of each element present in the powder metal material of Area #2;

FIG. 5 lists the preferred ranges of each element present in the powder metal material of Area #3;

FIG. 6 lists the preferred ranges of each element present in the powder metal material of Area #4;

DETAILED DESCRIPTION OF EXAMPLE EMBODIMENTS

Figure 2:
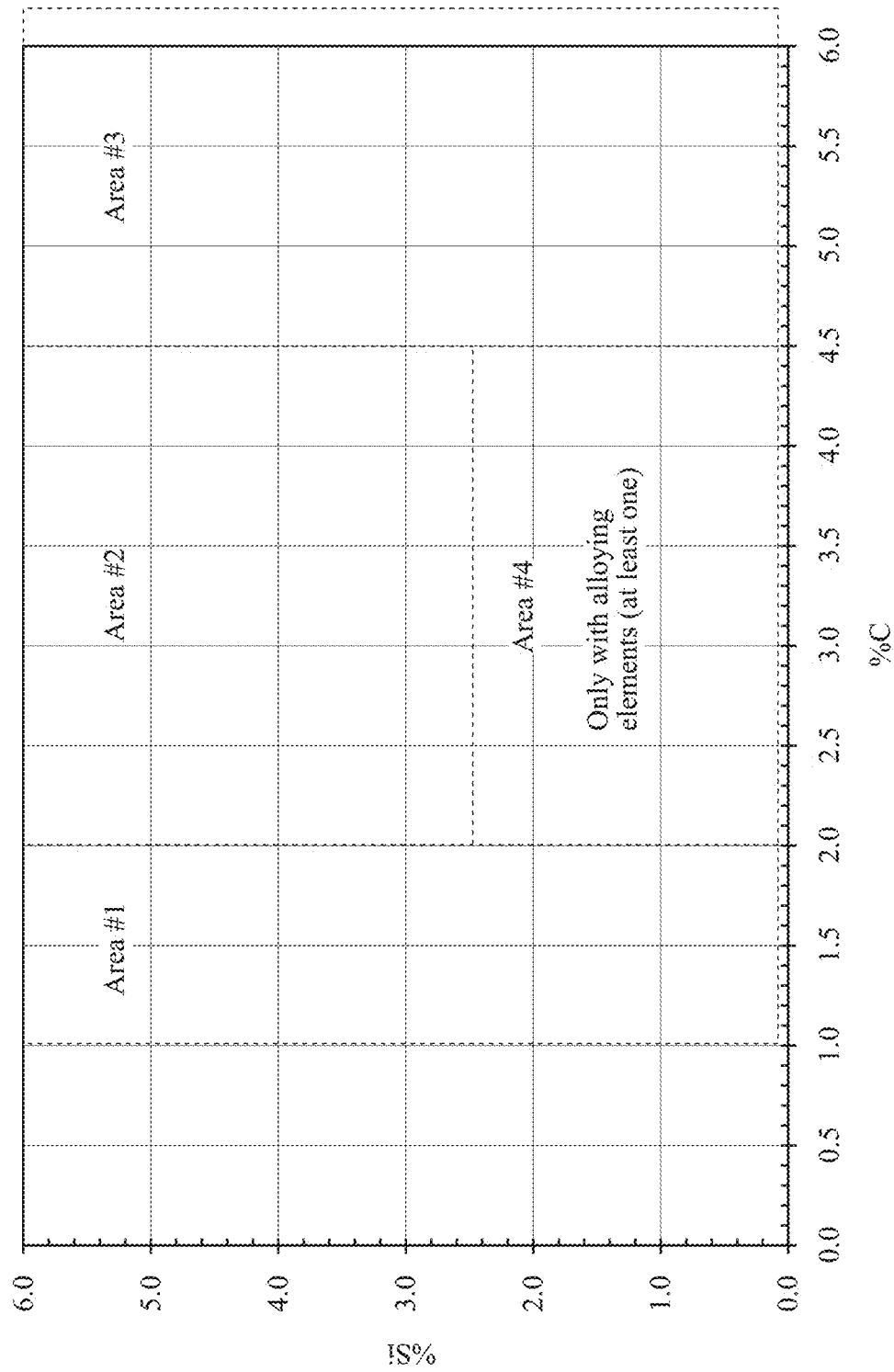
FIG. 2 is a diagram showing Areas #1 to #4, which each represent a range of possible compositions for the powder metal material.

One aspect of the invention provides a powder metal material containing free graphite, also referred to as free graphite containing powder. The powder metal material is formed by atomizing, typically by water or gas atomizing a melt, and preferably heat treating the atomized particles. The powder metal material can be used to form sintered parts, for example valve guides for automotive vehicles. The free graphite present in the powder metal material provides enhanced machinability, reduced weight, and the possibility for high relative density after sintering. The sintered parts formed from the powder metal material also have improved wear resistance due to increased lubrication provided by the free graphite.

The powder metal material includes iron and is typically a ferrous alloy, such as a cast iron powder. Cast iron microstructures are sought in the powder metal industry due to numerous advantages, including self-lubrication resulting from the presence of graphite, enhanced machinability, lighter weight due to the low density of graphite, and the possibility of larger sintered densities, including up to fully dense materials. However, the powder metal material could be another type of metal material, such as a nickel, cobalt, iron-based material and/or a mixture of these metals. An iron-based powder metal material includes iron in an amount of at least 50 wt. %, based on the total weight of the powder metal material. A nickel-based powder metal material includes nickel in an amount of at least 50 wt. %, based on the total weight of the powder metal material. A cobalt-based powder metal material includes cobalt in an amount of at least 50 wt. %, based on the total weight of the powder metal material. A material based on a mixture of iron, nickel, and/or cobalt includes the mixture in an amount of at least 50 wt. %. The powder metal material of each embodiment also includes carbon in an amount of at least 1.0 wt. % and up to 6.5 wt. %; and silicon in an amount of at least 0.1 wt. % and up to 6.0 wt. %, based on the total weight of the powder metal material.

Carbon constitutes the graphite and will dictate the maximum amount of graphite that can be formed. In other words, graphite is made of 100% carbon, so if the carbon content is too low, graphite will not precipitate. There is a factor of about 3.5 between the density of graphite and that of iron. Thus, 1.0 wt. % of carbon represents about 3.5 vol. % of graphite. The carbon supply should not be bounded with other elements, for example in carbides, as it would lower the possible amount of free graphite. The amount of carbide forming elements and the total carbon content should be carefully balanced in order to form free graphite. A combination of free graphite and other phases or microstructural constituents that contain carbon, such as carbides, is also possible.

Silicon is a graphitizer, meaning that it increases the activity of carbon in solution, so that the precipitation of graphite is favored. The effect of the silicon on the precipitation of graphite is larger in iron-rich systems. In ferrous systems, part of the carbon in solution in austenite will form carbides during cooling, for example cementite. However, silicon increases the activity of carbon in solution and will force the carbon out of solution and thus favor graphite precipitation. Silicon in the iron-carbon (Fe—C) system will increase the amount of liquid phase for a given temperature compared to a system without silicon. This will favor densification of parts formed of the powder metal material during supersolidus liquid phase sintering. Silicon will harden the ferrite, and when combined with other alloying elements, will increase hardenability. Silicon also has an effect on the diffusion of carbon, which is referred to as uphill diffusion. This phenomenon can be exploited to control the morphology of the graphite after sintering and thus better control the mechanical properties of the parts.

In cast iron powders, silicon promotes graphite precipitation as it decreases the amount of carbon in solution. In the case of atomized cast iron powders, most of the graphite will precipitate in solid state during a heat treatment after atomization. The larger the silicon content, the easier it is to promote graphite. A lower silicon content in cast iron requires a longer heat treatment to precipitate graphite. However, silicon could be introduced to the powder metal material to promote graphite, increase the hardness of ferrite and pearlite, and also increase hardenability. For a fixed amount of carbon, silicon will increase the amount of liquid phase at a given temperature compared to a lower silicon content cast iron. Thus, powder metal materials based on cast iron are ideal candidates for liquid phase sintering which can lead to large densifications, and up to fully dense materials.

The powder metal material can also include various other alloying elements. In addition to iron (Fe), at least one of nickel (Ni), carbon (C), silicon (Si), and cobalt (Co) are typically main constituents of the powder metal material with free graphite. However, nickel (Ni) and cobalt (Co) are not required. Other possible alloying elements include at least one of copper (Cu), tin (Sn), aluminum (Al), sulfur (S), phosphorous (P), boron (B), nitrogen (N), chromium (Cr), manganese (Mn), molybdenum (Mo), vanadium (V), niobium (Nb), tungsten (W), titanium (Ti), tantalum (Ta) zirconium (Zr), zinc (Zn), strontium (Sr), calcium (Ca), barium (Ba) magnesium (Mg), lithium (Li), sodium (Na), and potassium (K). An overview of possible compositions of the powder metal material is provided in the Table of FIG. 1.

The combination and amount of alloying elements used in the powder metal material varies depending on the base component(s) and the method used to form the powder metal material. For example, aluminum and zirconium are preferably used for gas-atomized powders. For powder metal materials based on cast iron, various alloying elements can be used in combination with silicon to create novel microstructures. For example, chromium, niobium, and/or vanadium, which are carbide forming elements, can be used in cast iron powders to promote the formation of both graphite and carbides. Cobalt can be used in cast iron powders to improve mechanical properties at high temperatures and obtain areas that contain free graphite for lubrication properties. Furthermore, the combination of vanadium, niobium, tungsten, tin, and cobalt can be used in cast iron powders to obtain unique properties such as a high wear resistance at high temperature from the presence of carbide in an iron matrix rich in cobalt.

Figure 7:
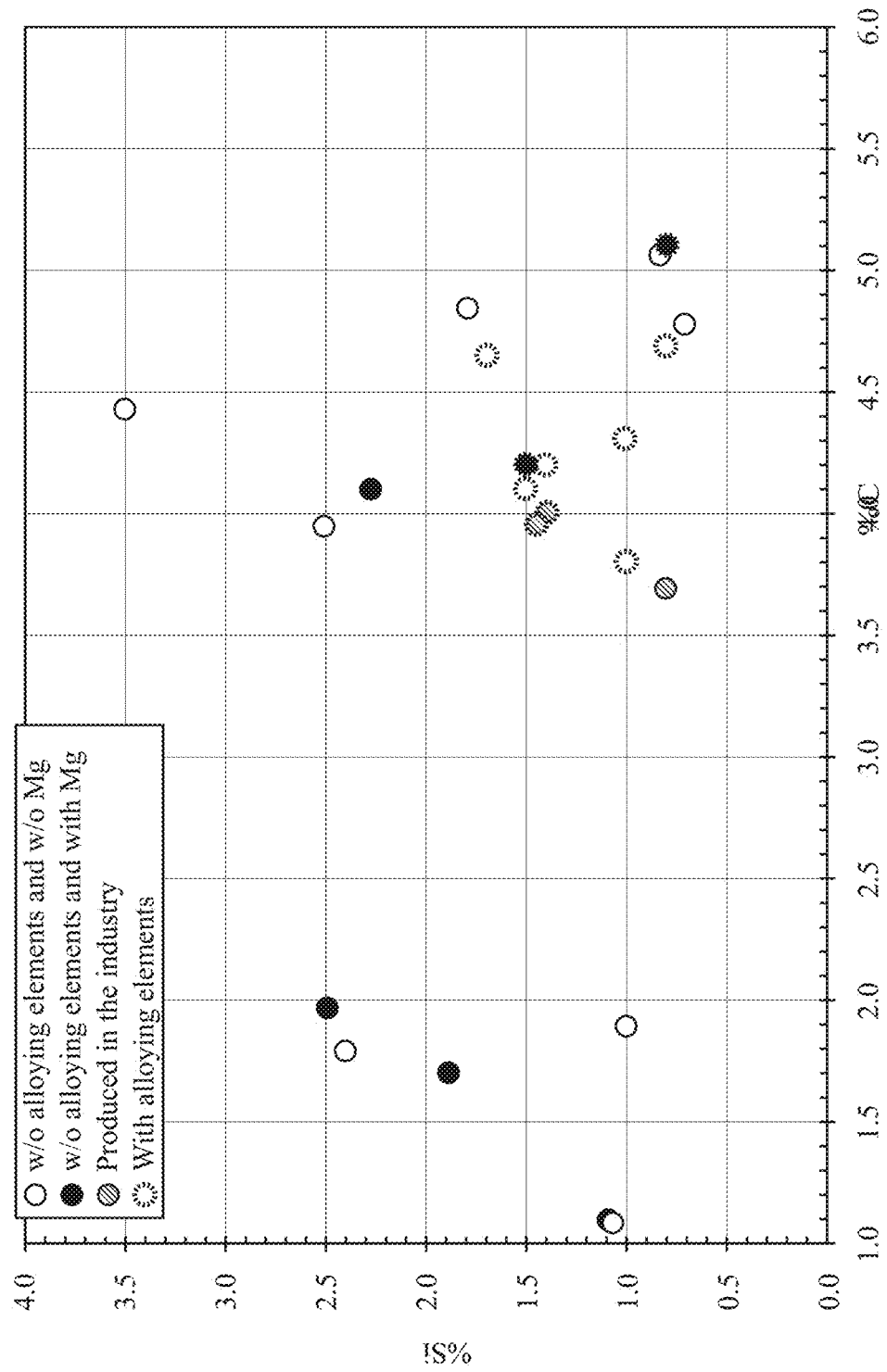
FIG. 7 is a chart showing several specific examples of the powder metal material containing free graphite.

FIG. 2 is a diagram showing four areas each representing a range of possible compositions for the powder metal material. The four areas presented are defined in terms of carbon wt. % and silicon wt. %, which are the two elements needed to obtain free graphite in iron-rich compositions. The compositions of Areas #1 to #3 only require carbon and silicon as alloying elements. However, the compositions of Area #4 typically require at least one additional alloying element. FIG. 3 list the preferred ranges of each element present in the powder metal material of Area #1. FIG. 4 lists the preferred ranges of each element present in the powder metal material of Area #2. FIG. 5 lists the preferred ranges of each element present in the powder metal material of Area #3. FIG. 6 lists the preferred ranges of each element present in the powder metal material of Area #4. The compositions disclosed in Area #1-4 are also provided in the following Tables 1-4. The composition of the powder metal material can include a combination of any of the different ranges or amounts disclosed in the Tables, for example the composition can include carbon range #1, silicon range #4, and nickel range #7 of Table 1. Another example is a composition including a carbon amount within range #1 and a silicon amount within range #2 of Table 1. A third example is a composition including carbon in range #2, silicon in range #2, and cobalt in range #3 from Table 4. FIG. 7 is a chart showing several specific examples of the powder metal material containing free graphite.

TABLE 1

(compositions from Area #1)

| | Area #1 | | | | | | | |
|---|---|---|---|---|---|---|---|---|
| | Range #1 | Range #2 | Range #3 | Range #4 | Range #5 | Range #6 | Range #7 | Specific Ex. |
| C | 1-2 | 1.1-2 | 1.2-1.9 | 1.2-1.8 | 1.3-1.7 | 1.35-1.65 | 1.4-1.6 | 1.5 |
| Si | 0.1-6 | 0.2-5 | 0.75-3 | 0.75-2 | 0.75-1.5 | 1.0-1.5 | 1.0-1.3 | 1.0 |
| Ni | 0-47 | 0-25 | 0-15 | 0-10 | 0-8 | 1-6 | 1.5-4 | 2.0 |
| Co | 0-47 | 0-35 | 0-20 | 0-15 | 0-10 | 0-5 | 1.0-4 | 3.0 |
| Cu | 0-40 | 0-30 | 0-20 | 0-15 | 0-10 | 0-5 | 1.0-5 | 1.0 |
| Sn | 0-15 | 0-10 | 0-5 | 0-2 | 0.5-1.5 | | | 2.0 |
| Al | 0-10 | 0-8 | 0-5 | 0-2 | 0.5-1 | | | 0.75 |
| S | 0-2.0 | 0-1.5 | 0-0.6 | 0.05-0.3 | | | | 0.05 |
| P | 0-2.0 | 0-1.5 | 0-1.0 | 0.05-0.4 | | | | 0.05 |
| B | 0-1.0 | 0-0.6 | 0-0.3 | 0-0.1 | | | | 0.005 |
| N | 0-1.0 | 0-0.6 | 0-0.3 | 0-0.1 | | | | 0.005 |
| Cr | 0-10 | 0-8 | 0-6 | 0-5 | 0-2 | 0.2-1.5 | 0.5-1.0 | 0.50 |
| Mn | 0-10 | 0-6 | 0-3 | 0-1 | 0.2-0.8 | | | 0.5 |
| Mo | 0-10 | 0-8 | 0-6 | 0-5 | 0-2 | 0.2-1.5 | 0.5-1.0 | 0.50 |
| V | 0-7 | 0-5 | 0-3 | 0-2 | 0.2-2 | 0.2-1 | 0.3-0.8 | 0.3 |
| Nb | 0-7 | 0-5 | 0-3 | 0-2 | 0.2-2 | 0.2-1 | 0.3-0.8 | 0.3 |
| W | 0-20 | 0-15 | 0-10 | 0-7 | 0-5 | 0.5-4 | 0.5-2 | 1 |
| Ti | 0-10 | 0-6 | 0-3 | 0.5-1.5 | | | | 0.5 |
| Ta | 0-7 | 0-3 | 0-1 | 0.2-0.8 | | | | 0.3 |
| Zr | 0-7 | 0-3 | 0-1 | 0.2-0.8 | | | | 0.3 |
| K/Na/Zn/Mg/Li/Sr/Ca/Ba | 0-1 | 0-0.5 | 0-0.2 | | | | | 0.2 |

TABLE 2

(compositions from Area #2)

| | Area #2 | | | | | | | |
|---|---|---|---|---|---|---|---|---|
| | Range #1 | Range #2 | Range #3 | Range #4 | Range #5 | Range #6 | Range #7 | Specific Ex. |
| C | 2.0-5.0 | 2.0-4.8 | 2.0-4.5 | 2.2-4.3 | 2.5-4.0 | 2.5-3.5 | 3.0-3.5 | 3.5 |
| Si | 2.5-6 | 2.5-4.5 | 2.5-4.0 | 2.6-4.0 | 2.6-3.5 | 2.6-3.2 | 2.7-3.0 | 2.7 |
| Ni | 0-44 | 0-25 | 0-15 | 0-10 | 0-8 | 1-6 | 1.5-4 | 2 |
| Co | 0-44 | 0-35 | 0-20 | 0-15 | 0-10 | 0-5 | 1.0-4 | 3 |
| Cu | 0-40 | 0-30 | 0-20 | 0-15 | 0-10 | 0-5 | 1.0-5 | 1 |
| Sn | 0-15 | 0-10 | 0-5 | 0-2 | 0.5-1.5 | | | 2 |
| Al | 0-10 | 0-8 | 0-5 | 0-2 | 0.5-1 | | | 0.75 |
| S | 0-2.0 | 0-1.5 | 0-0.6 | 0.05-0.3 | | | | 0.05 |
| P | 0-2.0 | 0-1.5 | 0-1.0 | 0.05-0.4 | | | | 0.05 |
| B | 0-1.0 | 0-0.6 | 0-0.3 | 0-0.1 | | | | 0.005 |
| N | 0-1.0 | 0-0.6 | 0-0.3 | 0-0.1 | | | | 0.005 |
| Cr | 0-20 | 0-15 | 0-10 | 0-6 | 0-3 | 0-1 | 0.2-0.8 | 0.5 |
| Mn | 0-25 | 0-15 | 0-10 | 0-6 | 0-3 | 0-1 | 0.2-0.8 | 0.5 |
| Mo | 0-10 | 0-8 | 0-6 | 0-5 | 0-2 | 0.2-1.5 | 0.5-1.0 | 0.5 |
| V | 0-10 | 0-8 | 0-6 | 0-3 | 0.2-2 | 0.5-1.5 | 0.5-1.0 | 0.7 |
| Nb | 0-10 | 0-8 | 0-6 | 0-3 | 0.2-2 | 0.5-1.5 | 0.5-1.0 | 0.7 |
| W | 0-20 | 0-15 | 0-10 | 0-7 | 0-5 | 0.5-4 | 0.5-2 | 1 |
| Ti | 0-10 | 0-6 | 0-3 | 0.5-1.5 | | | | 0.5 |
| Ta | 0-10 | 0-6 | 0-3 | 0-1 | 0.2-0.8 | | | 0.3 |
| Zr | 0-10 | 0-6 | 0-3 | 0-1 | 0.2-0.8 | | | 0.3 |
| K/Na/Zn/Mg/Li/Sr/Ca/Ba | 0-1 | 0-0.5 | 0-0.2 | | | | | 0.2 |

TABLE 3

(compositions from Area #3)

| | Area #3 | | | | | | | |
|---|---|---|---|---|---|---|---|---|
| | Range #1 | Range #2 | Range #3 | Range #4 | Range #5 | Range #6 | Range #7 | Specific Ex. |
| C | 5.0-6.5 | 5.05-6.0 | 5.05-5.5 | 5.05-5.4 | 5.05-5.35 | 5.08-5.30 | | 5.1 |
| Si | 0.1-6 | 0.2-5 | 0.5-4 | 0.5-3.5 | 0.5-2.5 | 0.75-2.0 | 0.75-1.75 | 1.3 |
| Ni | 0-44 | 0-25 | 0-15 | 0-10 | 0-8 | 1-6 | 1.5-4 | 2 |
| Co | 0-44 | 0-35 | 0-20 | 0-15 | 0-10 | 0-5 | 1.0-4 | 3 |

TABLE 3-continued (compositions from Area #3)

Area #3

|   | Range #1 | Range #2 | Range #3 | Range #4 | Range #5 | Range #6 | Range #7 | Specific Ex. |
|---|---|---|---|---|---|---|---|---|
| Cu | 0-40 | 0-30 | 0-20 | 0-15 | 0-10 | 0-5 | 1.0-5 | 1 |
| Sn | 0-15 | 0-10 | 0-5 | 0-2 | 0.5-1.5 |  |  | 2 |
| Al | 0-10 | 0-8 | 0-5 | 0-2 | 0.5-1 |  |  | 0.75 |
| S | 0-2.0 | 0-1.5 | 0-0.6 | 0.05-0.3 |  |  |  | 0.05 |
| P | 0-2.0 | 0-1.5 | 0-1.0 | 0.05-0.4 |  |  |  | 0.05 |
| B | 0-1.0 | 0-0.6 | 0-0.3 | 0-0.1 |  |  |  | 0.005 |
| N | 0-1.0 | 0-0.6 | 0-0.3 | 0-0.1 |  |  |  | 0.005 |
| Cr | 0-40 | 0-25 | 0-15 | 0-8 | 0-4 | 0.5-3 | 0.5-1.5 | 1 |
| Mn | 0-25 | 0-15 | 0-8 | 0-4 | 0.5-2 |  |  | 0.5 |
| Mo | 0-10 | 0-8 | 0-6 | 0-5 | 0-2 | 0.2-1.5 | 0.5-1.0 | 0.5 |
| V | 0-10 | 0-8 | 0-6 | 0-3 | 0.2-2 | 0.5-1.5 | 0.5-1.0 | 0.7 |
| Nb | 0-10 | 0-8 | 0-6 | 0-3 | 0.2-2 | 0.5-1.5 | 0.5-1.0 | 0.7 |
| W | 0-20 | 0-15 | 0-10 | 0-7 | 0-5 | 0.5-4 | 0.5-2 | 1 |
| Ti | 0-10 | 0-6 | 0-3 | 0.5-1.5 |  |  |  | 0.5 |
| Ta | 0-10 | 0-6 | 0-3 | 0-1 | 0.2-0.8 |  |  | 0.3 |
| Zr | 0-10 | 0-6 | 0-3 | 0-1 | 0.2-0.8 |  |  | 0.3 |
| K/Na/Zn/Mg/Li/Sr/Ca/Ba | 0-1 | 0-0.5 | 0-0.2 |  |  |  |  | 0.2 |

TABLE 4

(compositions from Area #4)

Area #4

|   | Range #1 | Range #2 | Range #3 | Range #4 | Range #5 | Range #6 | Range #7 | Specific Ex. |
|---|---|---|---|---|---|---|---|---|
| C | 2.0-5.0 | 2.2-4.8 | 2.3-4.5 | 2.3-4.0 | 2.5-4.0 | 2.6-3.8 | 2.6-3.5 | 3 |
| Si | 0.1-2.5 | 0.5-2.5 | 0.5-2.3 | 0.5-2.0 | 0.75-2.0 | 1.0-2.0 | 1.2-1.8 | 1.5 |
| Ni | 4-46 | 4-35 | 4-25 | 5-20 | 5-15 | 5-10 | 7-13 | 7 |
| Co | 0.1-46 | 0.5-35 | 0.5-20 | 1.0-15 | 1.0-10 | 1.5-6 | 2-4.5 | 3 |
| Cu | 3-40 | 4-30 | 4-20 | 4-15 | 4-10 | 4-8 | 5-7 | 5 |
| Sn | 0.1-15 | 0.2-10 | 0.5-5 | 0.5-2 | 0.5-1.0 |  |  | 0.75 |
| Al | 0.1-10 | 0.5-8 | 0.5-5 | 0.5-2 |  |  |  | 0.75 |
| S | 0.05-2.0 | 0.1-1.5 | 0.1-0.6 | 0.2-0.4 |  |  |  | 0.3 |
| P | 1.0-2.0 | 1.0-1.5 | 1.1-1.4 |  |  |  |  | 1.25 |
| B | 0.20-1.0 | 0.20-0.40 |  |  |  |  |  | 0.3 |
| N | 0.05-1.0 | 0.05-0.6 | 0.1-0.3 |  |  |  |  | 0.1 |
| Cr | 2-25 | 2-20 | 2-15 | 3-15 | 3-10 | 3-8 | 4-7 | 4 |
| Mn | 2-25 | 3-15 | 3-10 | 4-7 |  |  |  | 4 |
| Mo | 4-10 | 4-8 | 4-6 | 4.5-6 | 4.5-5.5 | 4.5-5.0 |  | 4.5 |
| V | 0.1-10 | 0.5-8 | 0.5-6 | 0.75-6 | 1-5 | 1-4 | 1.5-3.5 | 2 |
| Nb | 0.1-10 | 0.5-8 | 0.5-6 | 0.75-6 | 1-5 | 1-4 | 1.5-3.5 | 2 |
| W | 0.1-20 | 0.5-15 | 0.5-10 | 0.5-8 | 0.5-5 | 0.75-4 | 1.0-3.5 | 1 |
| Ti | 0.1-10 | 0.5-8 | 0.5-5 | 0.75-3.5 |  |  |  | 0.75 |
| Ta | 0.1-10 | 0.5-8 | 0.5-5 | 0.75-3.5 |  |  |  | 0.75 |
| Zr | 0.1-10 | 0.5-8 | 0.5-5 | 0.75-3.5 |  |  |  | 0.75 |
| K/Na/Zn/Mg/Li/Sr/Ca/Ba | 0-1 | 0-0.5 | 0-0.2 |  |  |  |  | 0.2 |

According to one example embodiment, the powder metal material comprises about 1.0 wt. % to about 2.0 wt. % carbon and about 0.1 wt. % to about 6.0 wt. % silicon, based on the total weight of the powder metal material. According to another embodiment, the powder metal material comprises about 1.1 wt. % to about 2.0 wt. % carbon and about 0.2 to about 5.0 wt. % silicon, or about 1.2 wt. % to about 1.9 wt. % carbon and about 0.75 to about 3.0 wt. % silicon, or about 1.2 wt. % to about 1.8 wt. % carbon and about 0.75 to about 2.0 wt. % silicon, or about 1.3 wt. % to about 1.7 wt. % carbon and about 0.75 to about 1.5 wt. % silicon, or about 1.35 wt. % to about 1.65 wt. % carbon and about 1.0 to about 1.5 wt. % silicon, or about 1.4 wt. % to about 1.6 wt. % carbon and about 1.0 to about 1.3 wt. % silicon, or specifically 1.5 wt. % carbon and 1.0 wt. % silicon based on the total weight of the powder metal material. The example powder metal material with the carbon and silicon contents listed above can also include at least one of nickel, cobalt, copper, tin, aluminum, sulfur, phosphorous, boron, nitrogen, chromium, manganese, molybdenum, vanadium, niobium, tungsten, titanium, tantalum, zirconium or a mixture thereof. The example powder metal material can further include nickel in an amount less than about 47 wt. %, or less than about 25 wt. %, or less than about 15 wt. %, or less than about 10 wt. %, or less than about 8 wt. %, or more than 1 wt % and less than 6 wt %, or more than 1.5 wt % and less than 4 wt %, or specifically 2.0 wt % based on the total weight of the powder metal material. The composition of the powder metal material can include a combination of any of the different ranges disclosed in the Tables, for example the powder metal material comprises about 1.1 wt. % to about 2.0 wt. % carbon and about 0.75 to about 2.0 wt. % silicon.

According to one example embodiment, both chromium (Cr) and manganese (Mn) are not over 3 wt. % each together in the same powder metal material and not have at least one of these element present: cobalt (Co), tin (Sn), aluminum (Al), titanium (Ti), tantalum (Ta), or zirconium (Zr). In other words, if the composition of the powder metal material does not include cobalt (Co), tin (Sn), aluminum (Al), titanium (Ti), tantalum (Ta), or zirconium (Zr), then the amount of chromium in the composition is not greater than 3.0 wt. % and the amount of manganese in the composition is not greater than 3.0 wt. %.

According to one embodiment, the powder metal material containing free graphite is formed by gas or water atomizing a molten metal material having one of the compositions previously mentioned. However, other atomization processes such as plasma atomization or rotating disk atomization can be used. At least some of the free graphite can be present in the atomized particles, due to the specific composition selected (usually for hypereutectic compositions such as 4.6 wt % C and 2.6 wt % Si). However, the atomized particles are preferably heat treated to increase the total amount of free graphite. The specific temperature and conditions of the heat treatment process is adjusted depending on the chemical composition. During the heat treatment process, the free graphite precipitates and the amount of hard phases in the powders, for example carbides, decreases, thus increasing compressibility of the powder metal material.

The atomized and preferably heat treated powder metal materials can have various different microstructures depending on the specific composition and process used. For example the microstructure can include at least one of pearlite, ferrite, graphite, bainite, ausferrite, austenite and martensite. In some embodiments, Sn-rich phases, carbides, and other microstructural features can be present in the powder metal material.

Figure 8:
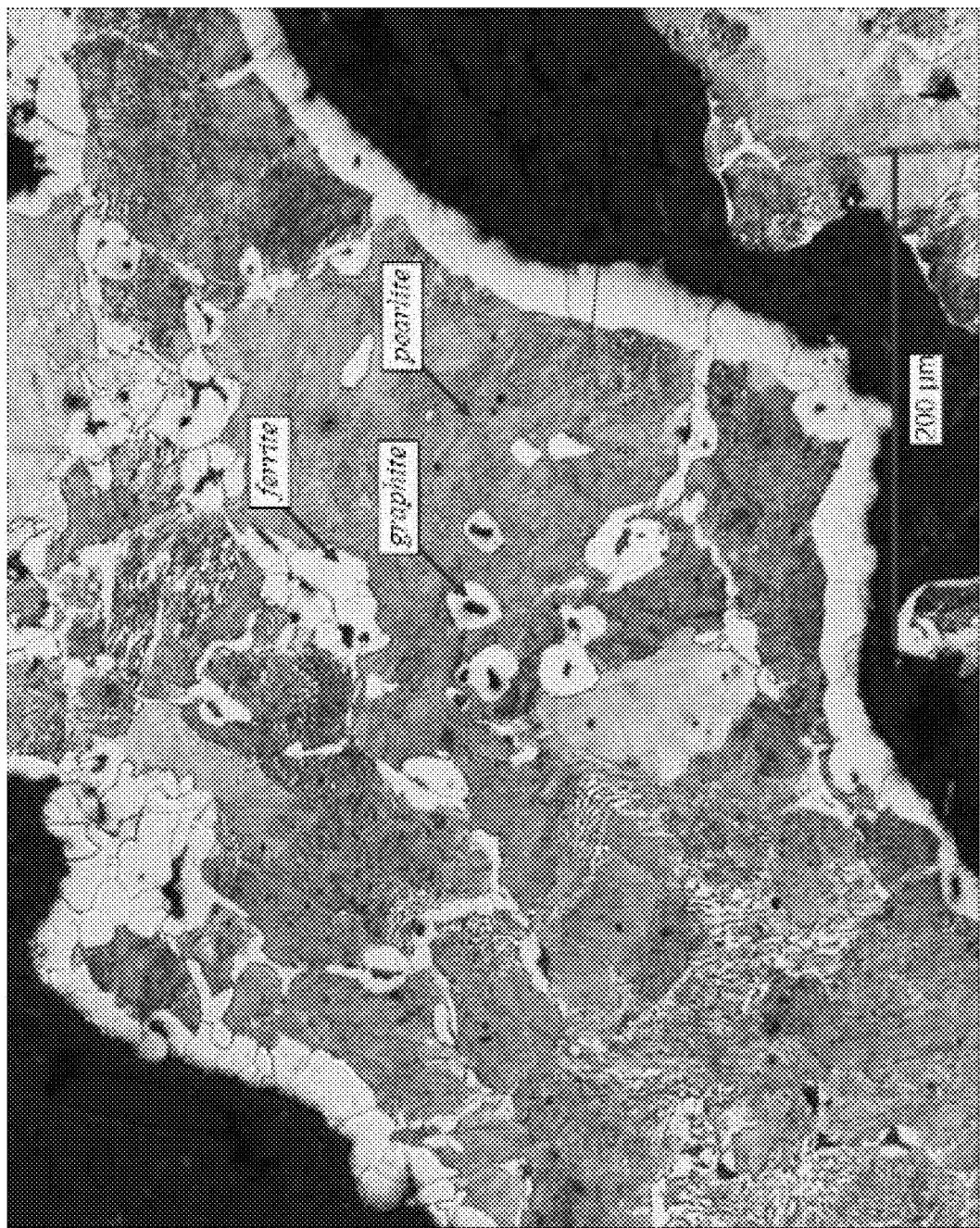
FIGS. 8-16 illustrate the microstructures of example powder metal material.

FIGS. 8-23 illustrate the microstructures of example powder metal materials and sintered parts having one of the example compositions mentioned above. FIG. 8 shows the microstructure of a heat treated powder metal material having a composition within Area #1, which includes 1.1 wt. % carbon and 1.1 wt. % silicon. The microstructure of the powder metal material of FIG. 8 includes a mixture of pearlite, ferrite, and graphite.

Figure 9:
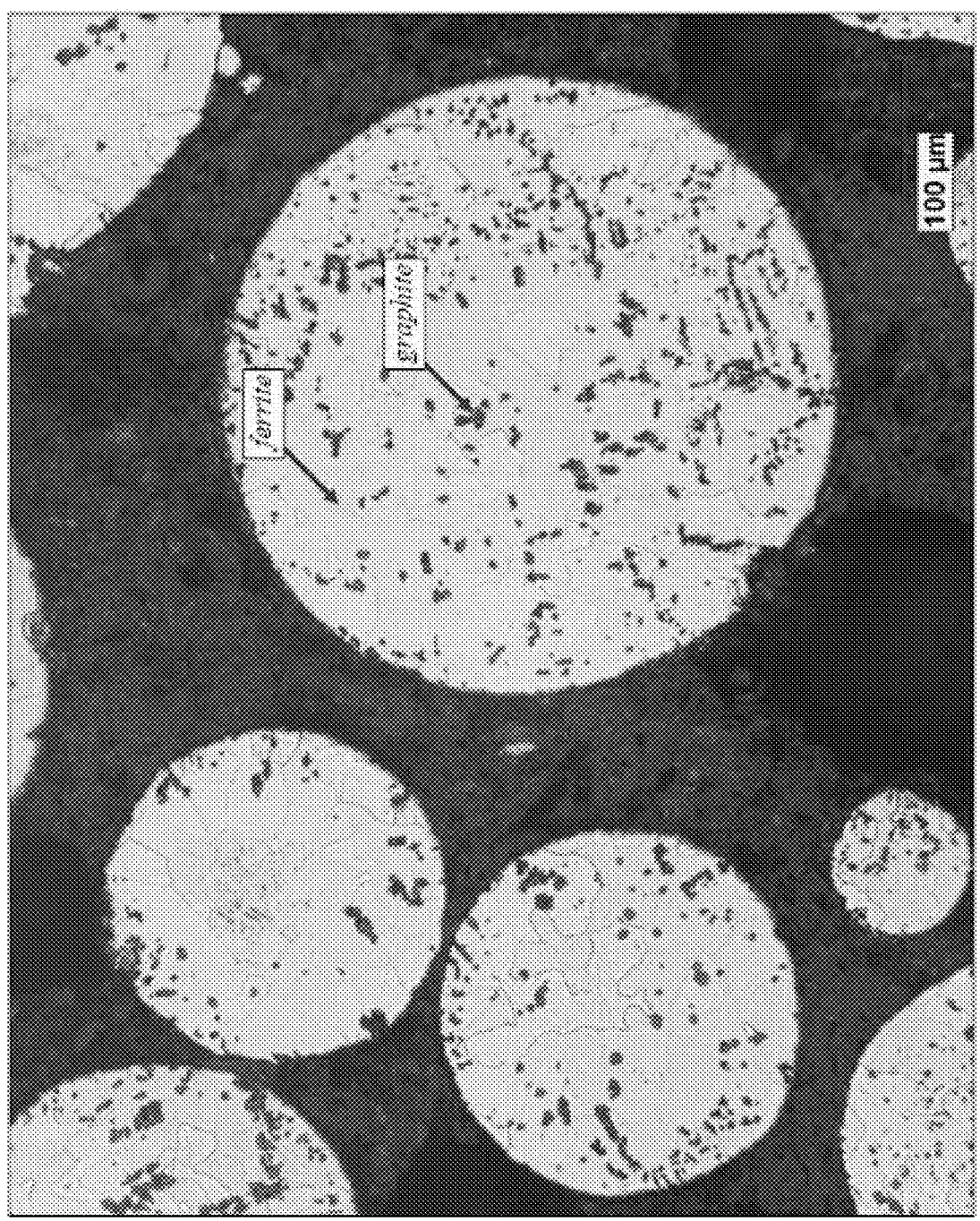

FIG. 9 shows the microstructure of a heat treated powder metal material having a composition within Area #1, which includes 1.8 wt. % carbon, 2.0 wt. % silicon, and treated with 0.20 wt. % magnesium before atomization. The microstructure of the powder metal material of FIG. 9 includes a mixture of ferrite and graphite.

Figure 10:
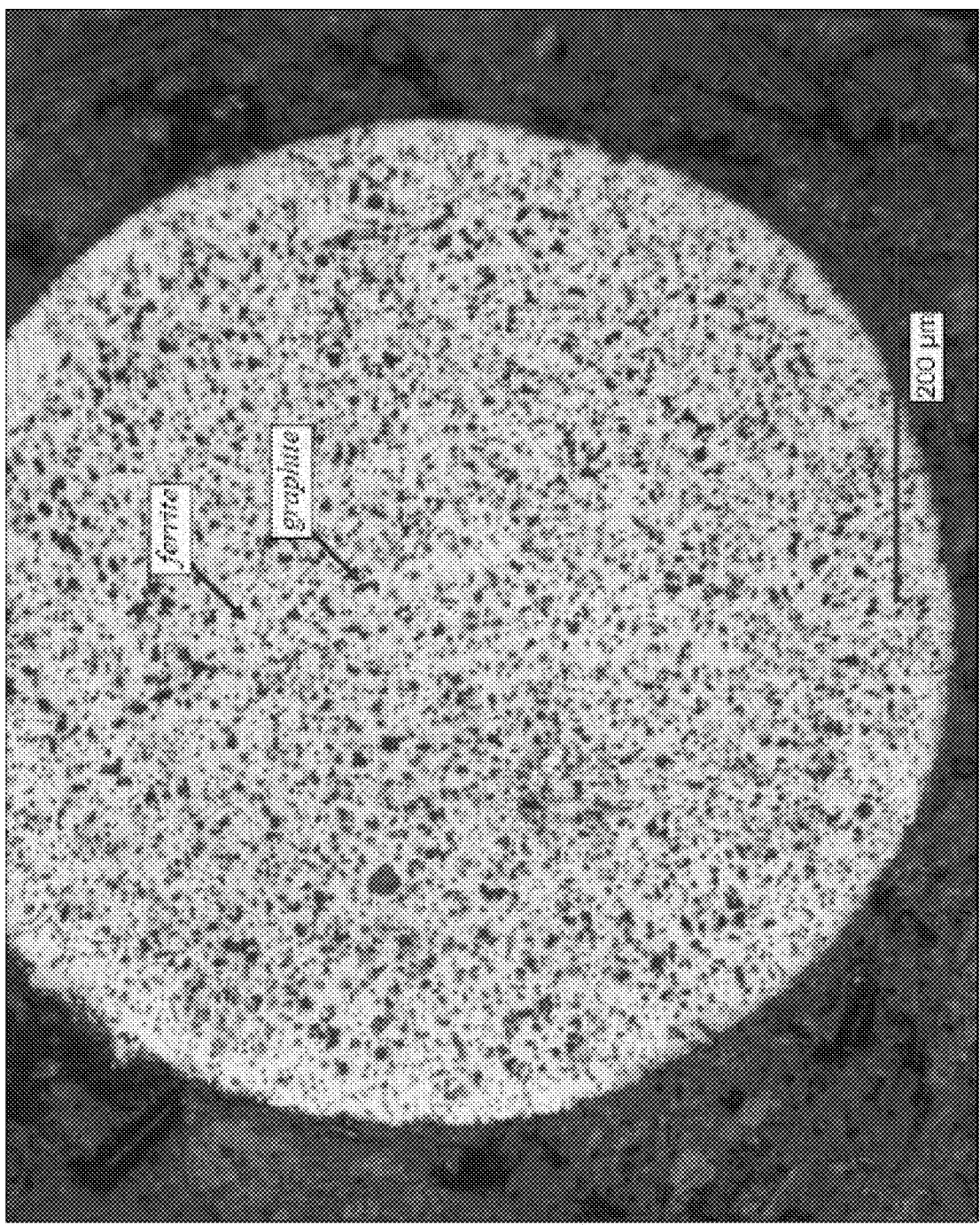

FIG. 10 shows the microstructure of a heat treated powder metal material having a composition within Area #4 and close to Area #2, which includes 4.0 wt. % carbon, 2.5 wt. % silicon, and treated with 0.22 wt. % magnesium before atomization. The microstructure of the powder metal material of FIG. 10 includes a mixture of ferrite and graphite (about 20% vol).

Figure 11:
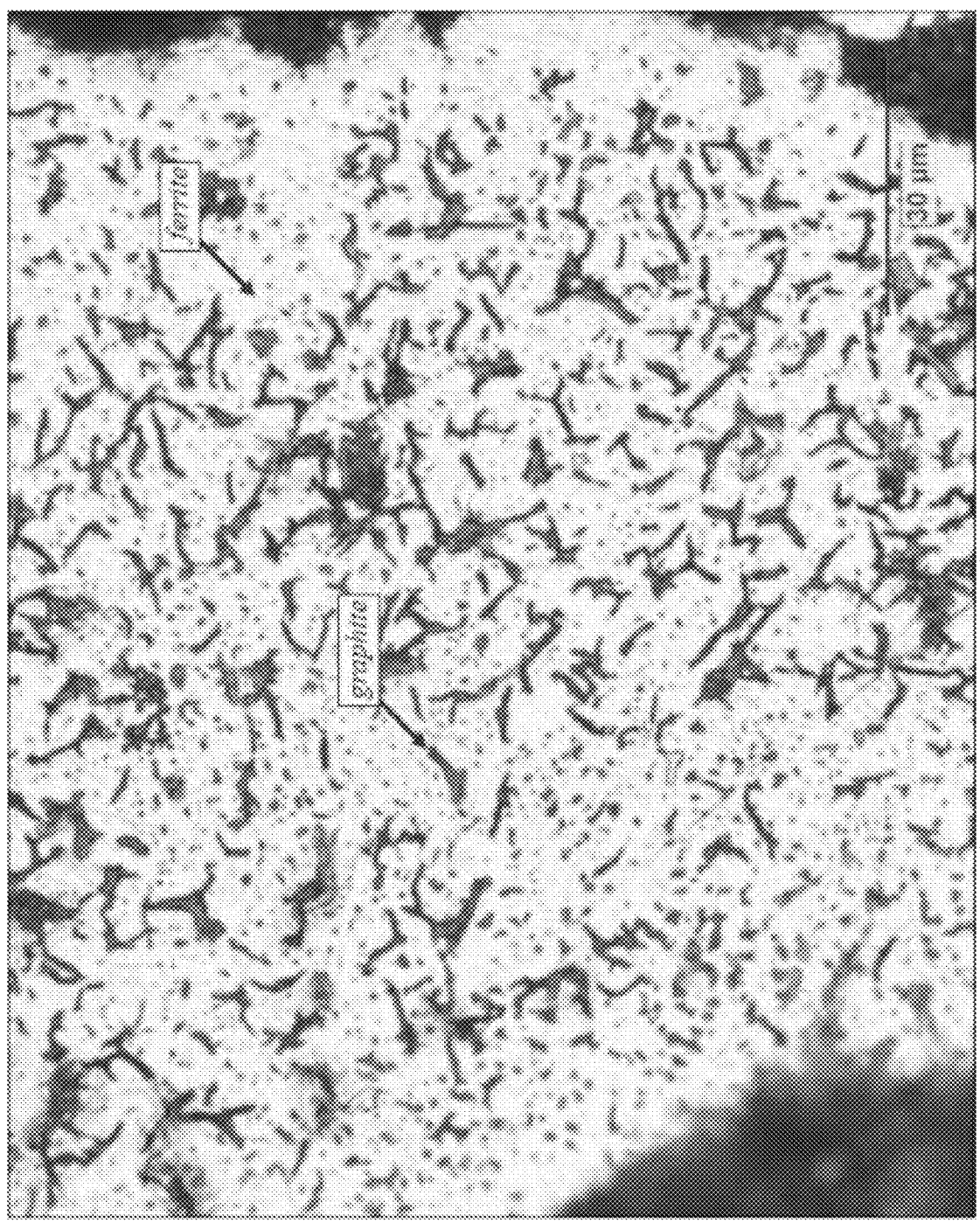

FIG. 11 shows the microstructure of a heat treated powder metal material having a composition within Area #2 which includes 4.5 wt. % carbon and 3.5 wt. % silicon. The microstructure of the powder metal material of FIG. 11 includes a mixture of ferrite and graphite.

Figure 12:
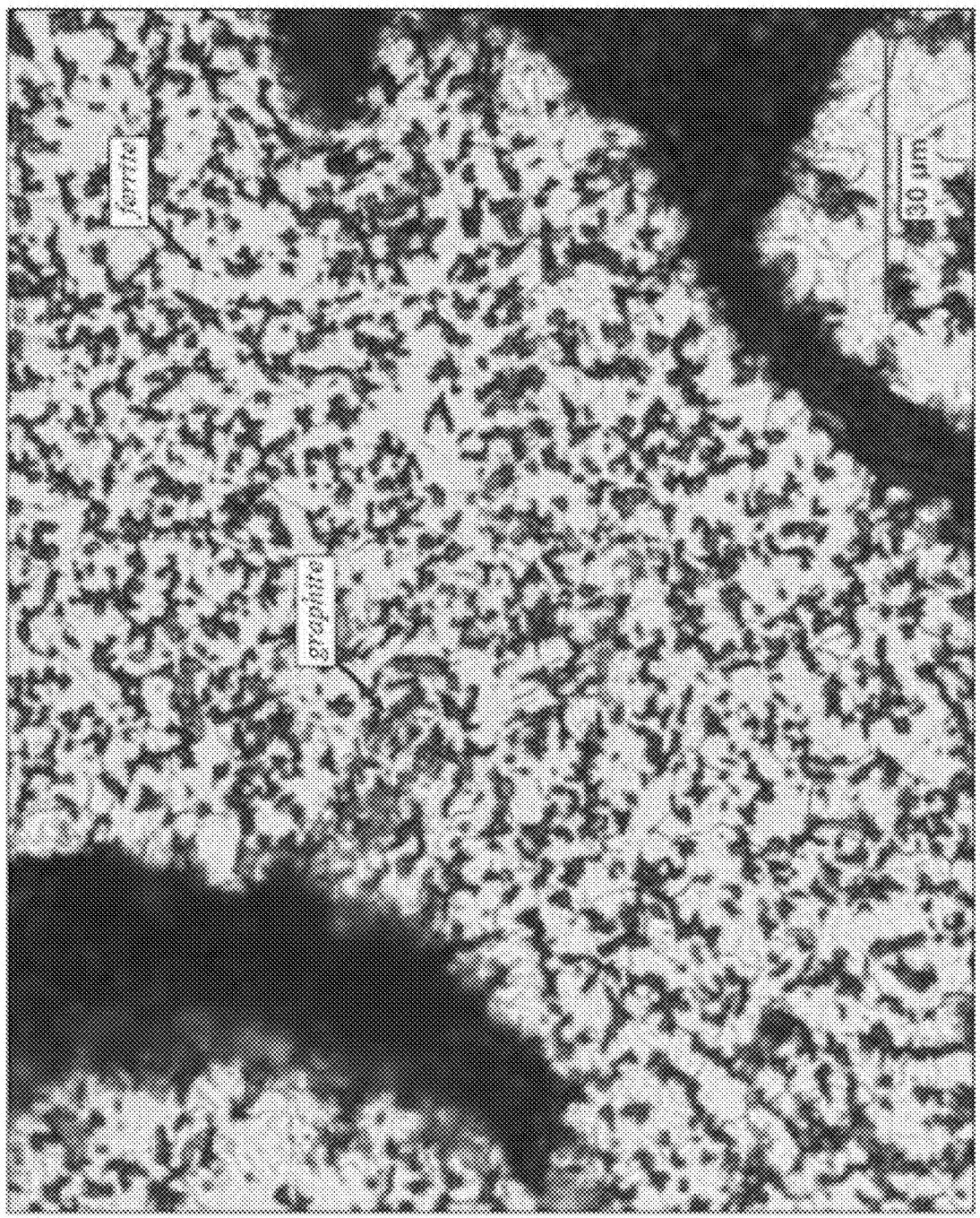

FIG. 12 shows the microstructure of a heat treated powder metal material having a composition within Area #3, which includes 5.1 wt. % carbon and 0.8 wt. % silicon. The microstructure of the powder metal material of FIG. 12 includes a mixture of ferrite and graphite.

Figure 13:
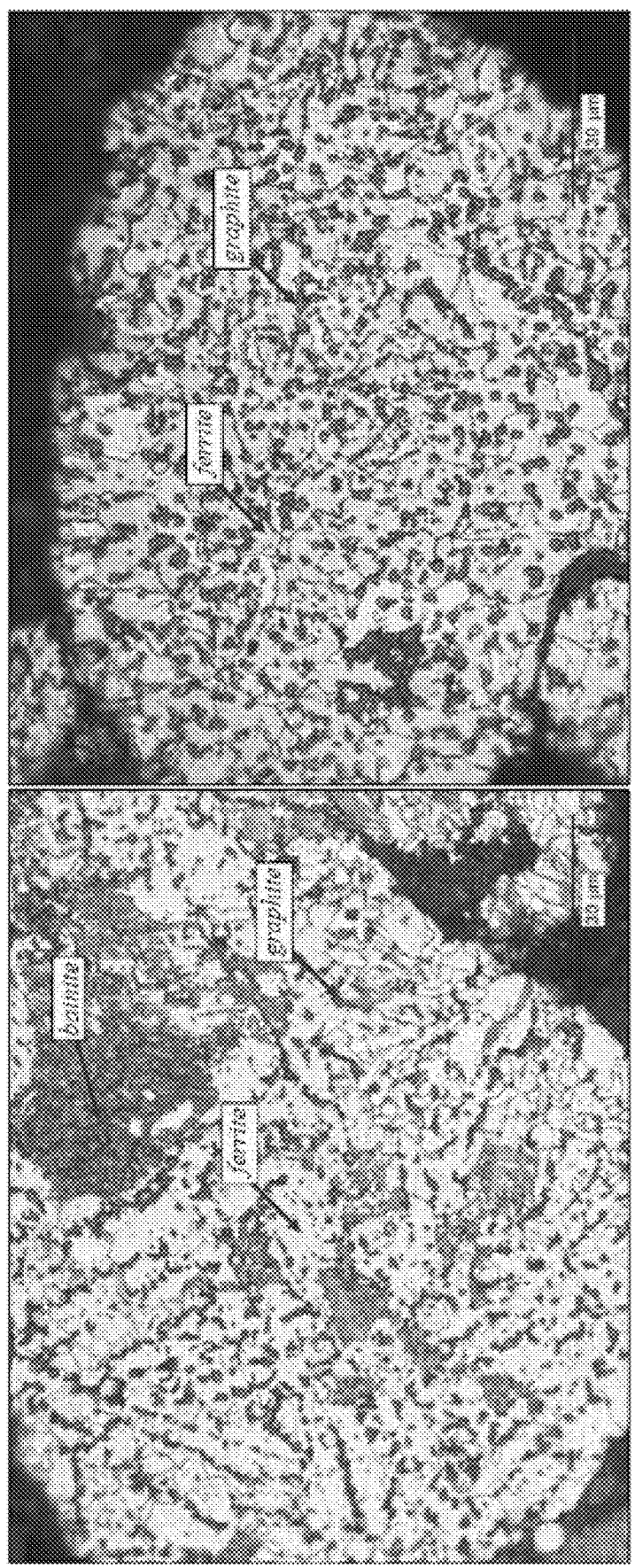

FIG. 13 shows the microstructure of a powder metal material having a composition within Area #4, which includes 4.8 wt. % carbon, 0.7 wt. % silicon, 1.0 wt. % copper, and 0.36 wt. % molybdenum, when the material is subjected to two different heat treatments. The two images of FIG. 13 that show the microstructure differs depending on the heat treatment process applied. The microstructure of the powder metal material on the left side of FIG. 13 includes a mixture of ferrite, graphite, and bainite. The microstructure on the right side of FIG. 13 includes a mixture of ferrite and graphite.

Figure 14:
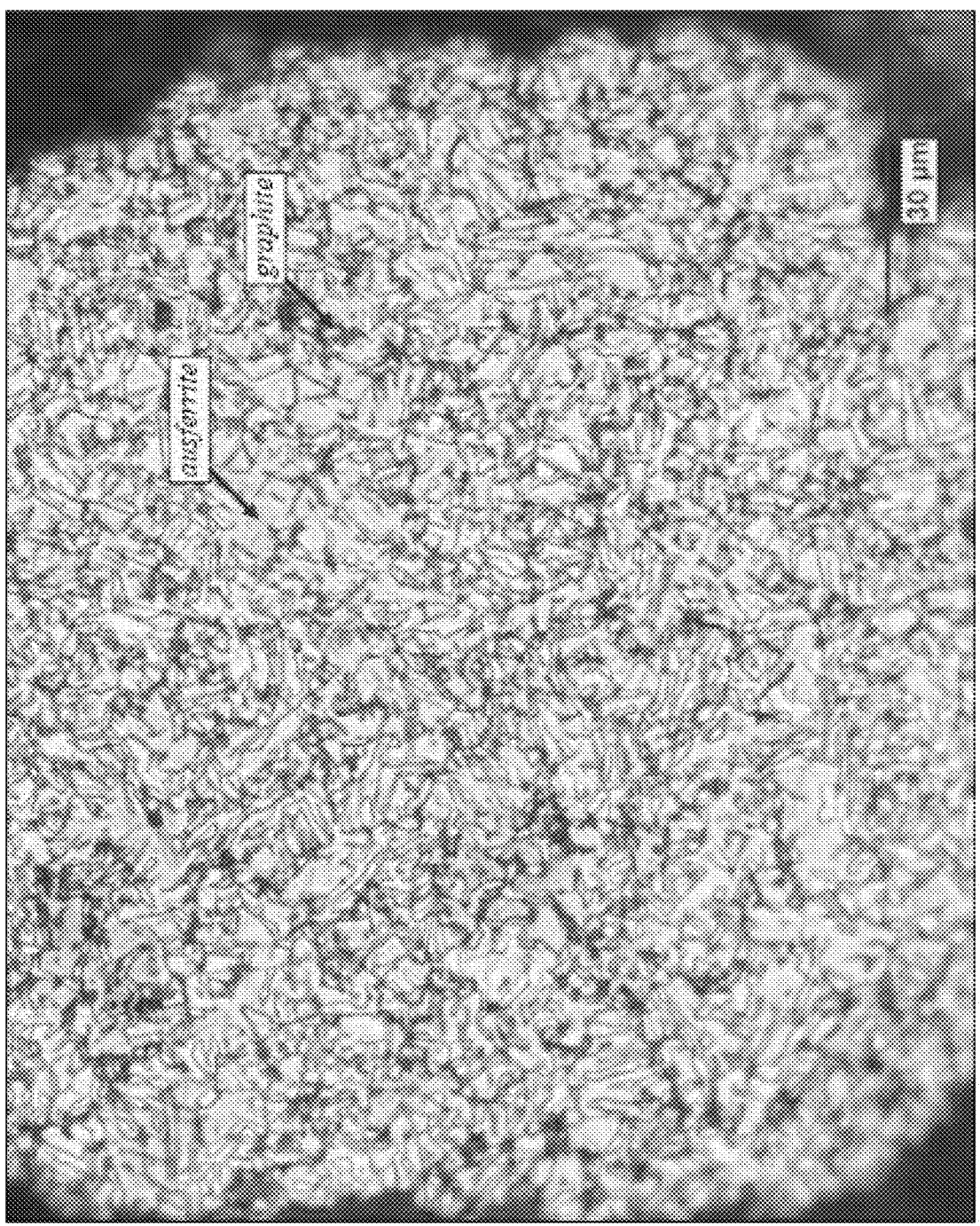

FIG. 14 shows the microstructure of a heat treated powder metal material having a composition within Area #4, which includes 4.7 wt. % carbon, 0.7 wt. % silicon, 2.4 wt. % copper, and 0.60 wt. % molybdenum. The microstructure of the powder metal material of FIG. 14 includes a mixture of ausferrite and graphite.

Figure 15:
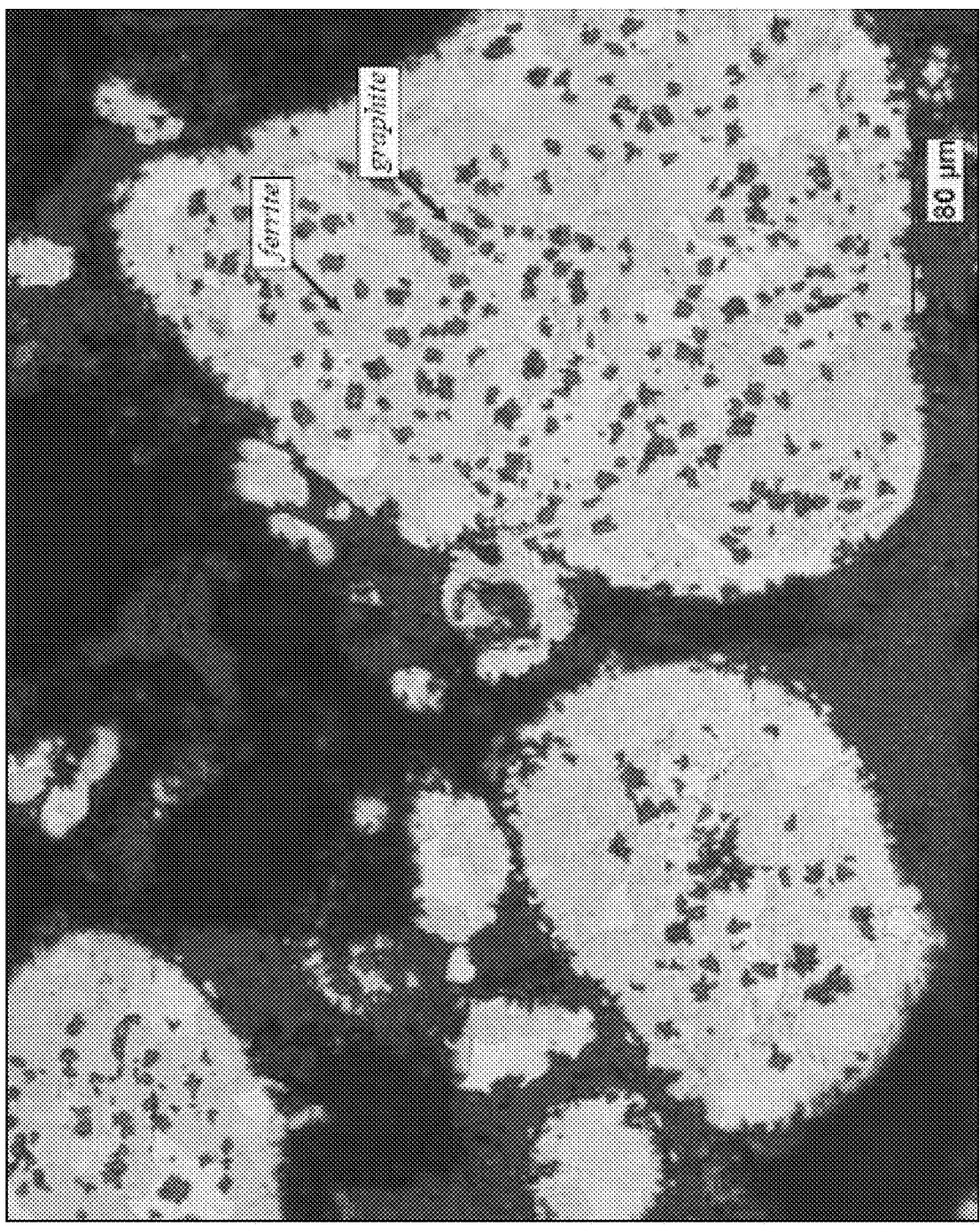

FIG. 15 shows the microstructure of a heat treated powder metal material having a composition within Area #4, which includes 3.8 wt. % carbon, 1.0 wt. % silicon, 3.5 wt. % copper, and 0.5 wt. % molybdenum. The microstructure of the powder metal material of FIG. 15 includes a mixture of ferrite and graphite.

Figure 16:
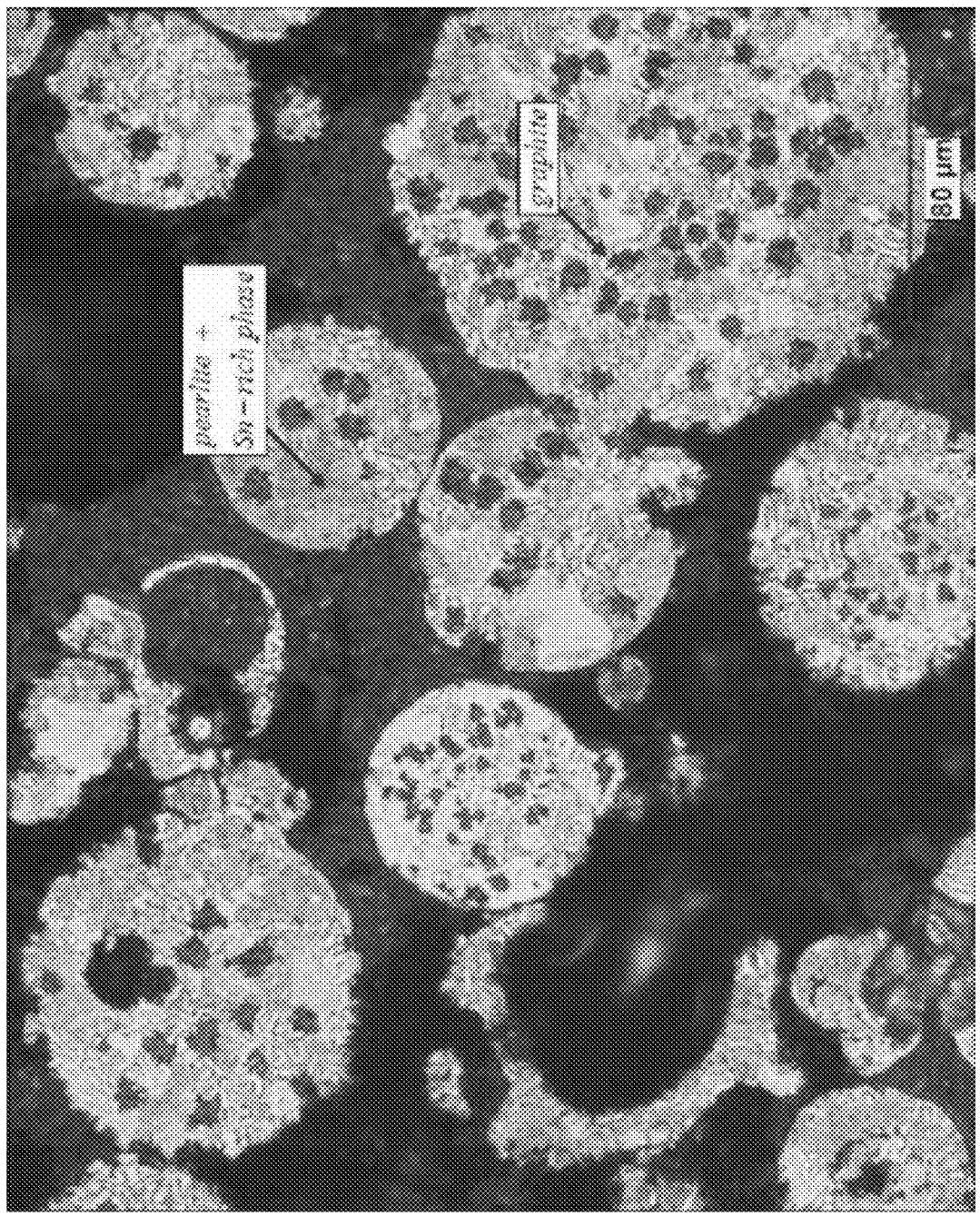

FIG. 16 shows the microstructure of a heat treated powder metal material having a composition within Area #4, which includes 4.1 wt. % carbon, 1.5 wt. % silicon, and 5.0 wt. % tin. The microstructure of the powder metal material of FIG. 16 includes a mixture of pearlite, graphite, and a Sn-rich phase intimately mixed with pearlite.

Figure 17:
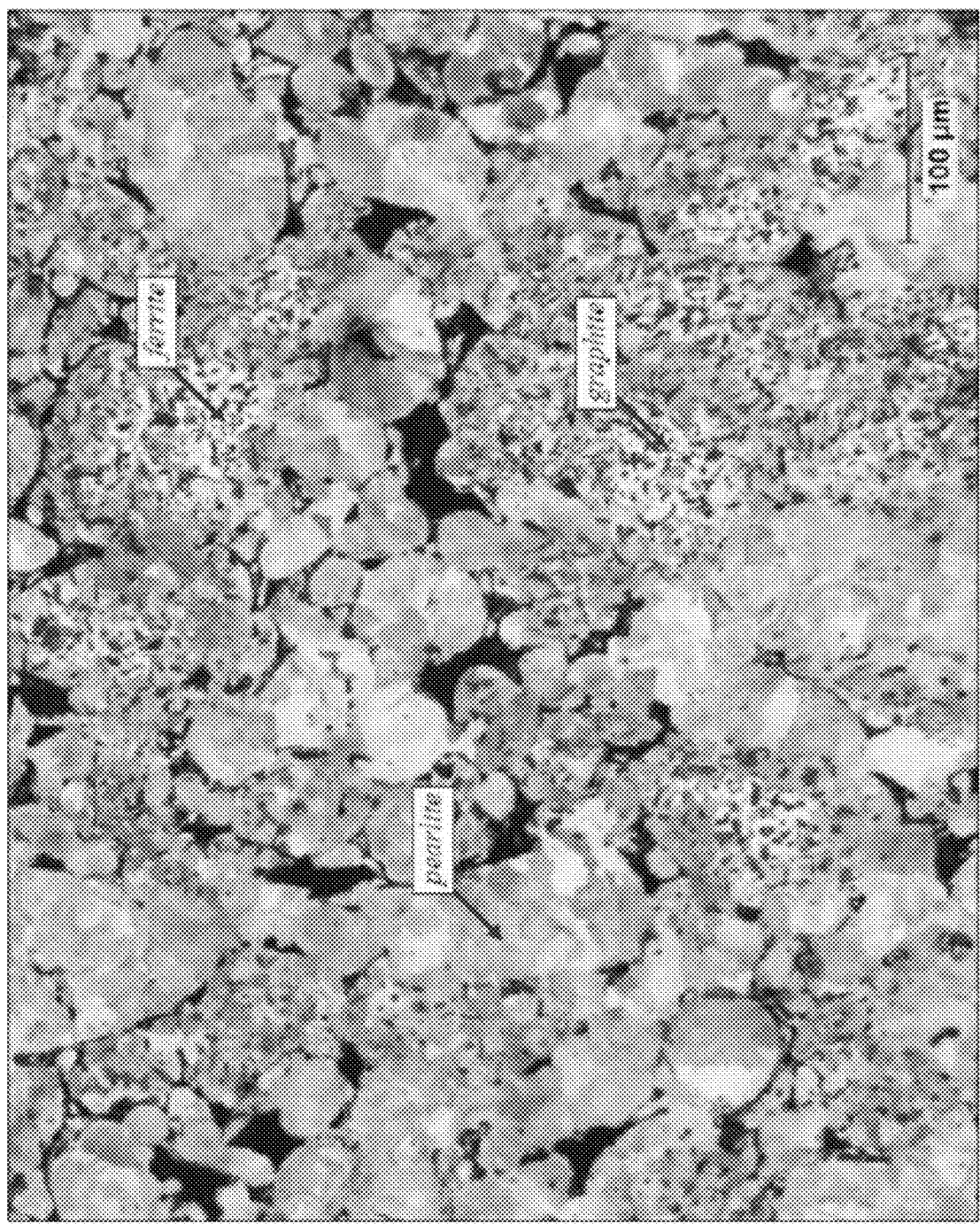
FIGS. 17-23 illustrate the microstructure of sintered powder mixes that contain at least one of the novel powder metal materials.

FIG. 17 shows the microstructure of a part after solid state sintering. The part includes a mixture of powder metal materials, specifically greater than 40.0 wt. % of a powder metal material having a composition within Area #1, and greater than 40.0 wt. % of a powder metal material having a composition within Area #4. The microstructure of the part of FIG. 17 includes a mixture of pearlite, ferrite, and graphite precipitates in the center of the grains.

Figure 18:
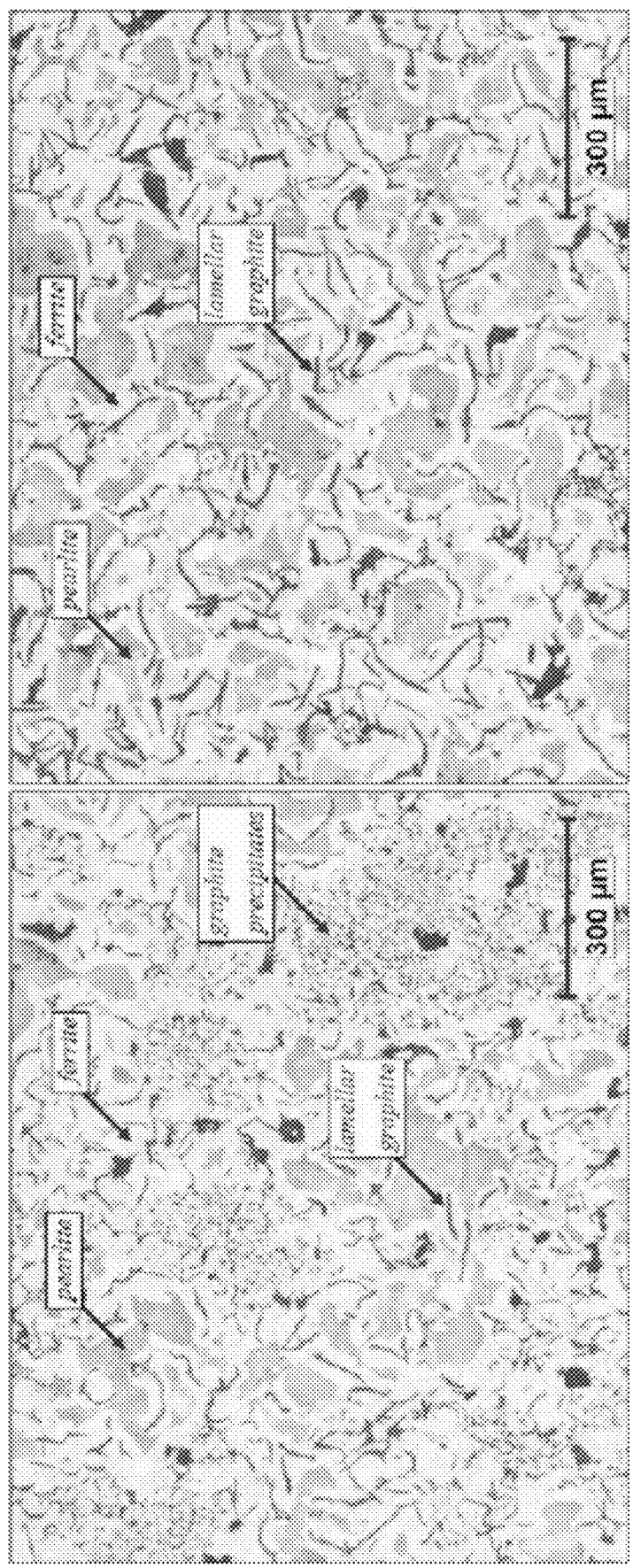

FIG. 18 shows the microstructure of two parts after supersolidus liquid phase sintering using the same thermal profile. The first part is formed of a mixture including less than 75.0 wt. % of a first powder metal material having a composition within Area #1, and greater than 25.0 wt. % of a second powder metal material having a composition within Area #4. The second part is formed of a mixture including less than 75.0 wt. % of the same first powder metal material having the composition within Area #1, and greater than 25.0 wt. % of a different second powder metal material having a composition within Area #4. The amount of silicon in the second powder metal material of the second part is different from the amount of silicon in the second powder metal material of the first part. The image on the left of FIG. 18 shows the microstructure of the first part includes pearlite, ferrite, and areas that contain many small graphite precipitates located inside the grains and some lamellar graphite between the grains. The image on the right of FIG. 18 shows the microstructure of the second part includes pearlite, ferrite, and only lamellar graphite. The local silicon concentration gradient is different in the two parts, which enables the control of the free graphite morphology by the control of the uphill diffusion of carbon. In addition, both parts have a densification of greater than 6%.

Figure 19:
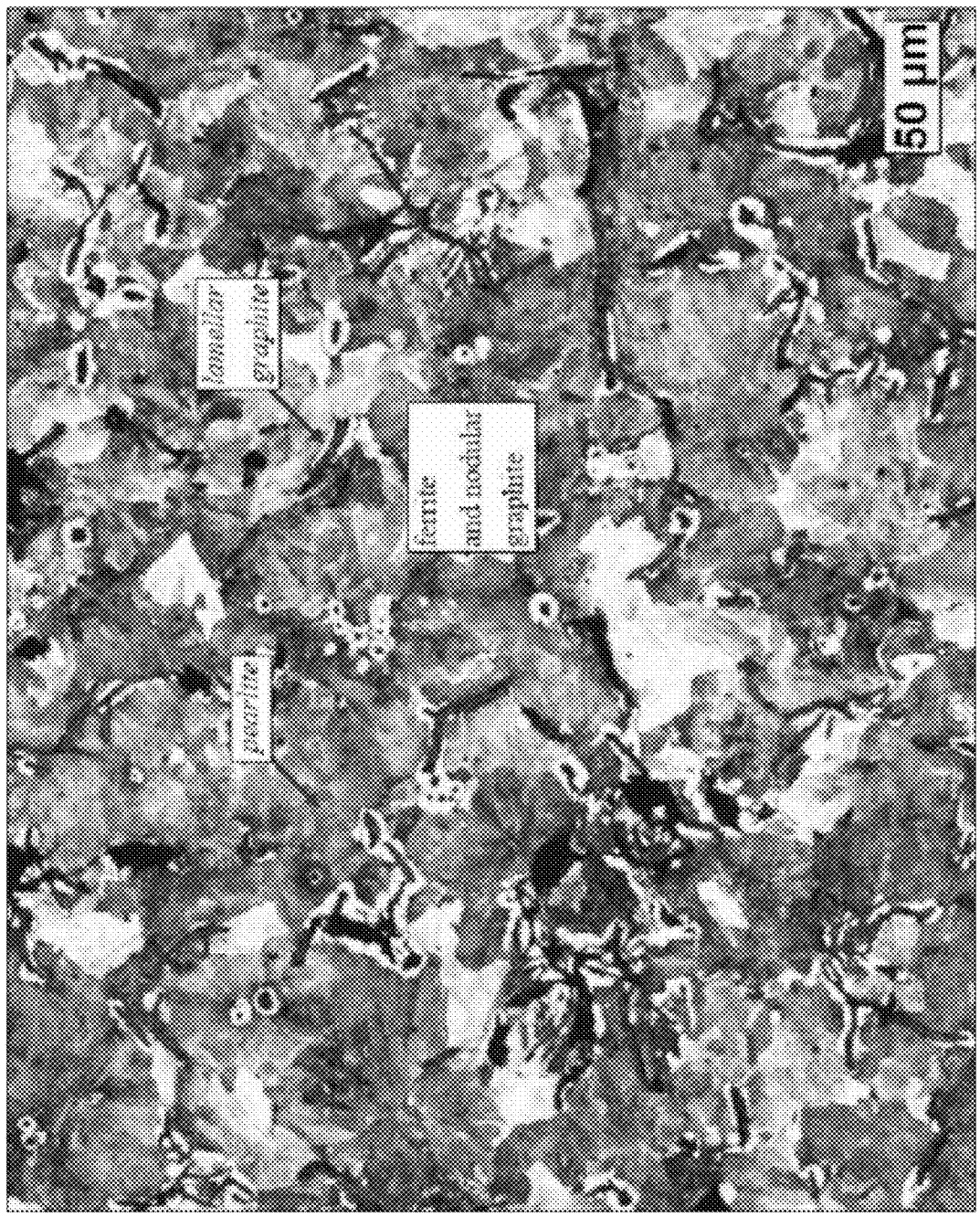

FIG. 19 shows the microstructure of a part that has a nominal composition of 2.4 wt. % carbon, 1.0 wt. % silicon after supersolidus liquid phase sintering of a mixture comprising a powder from Area #4 that was treated with Mg before the atomization, in an amount greater than 30.0 wt. % and a second common iron-rich powder metal material. The microstructure of FIG. 19 includes a matrix of pearlite with lamellar graphite, a few ferrite areas, and some nodular graphite. The part has a densification of greater than 7.5%.

Figure 20:
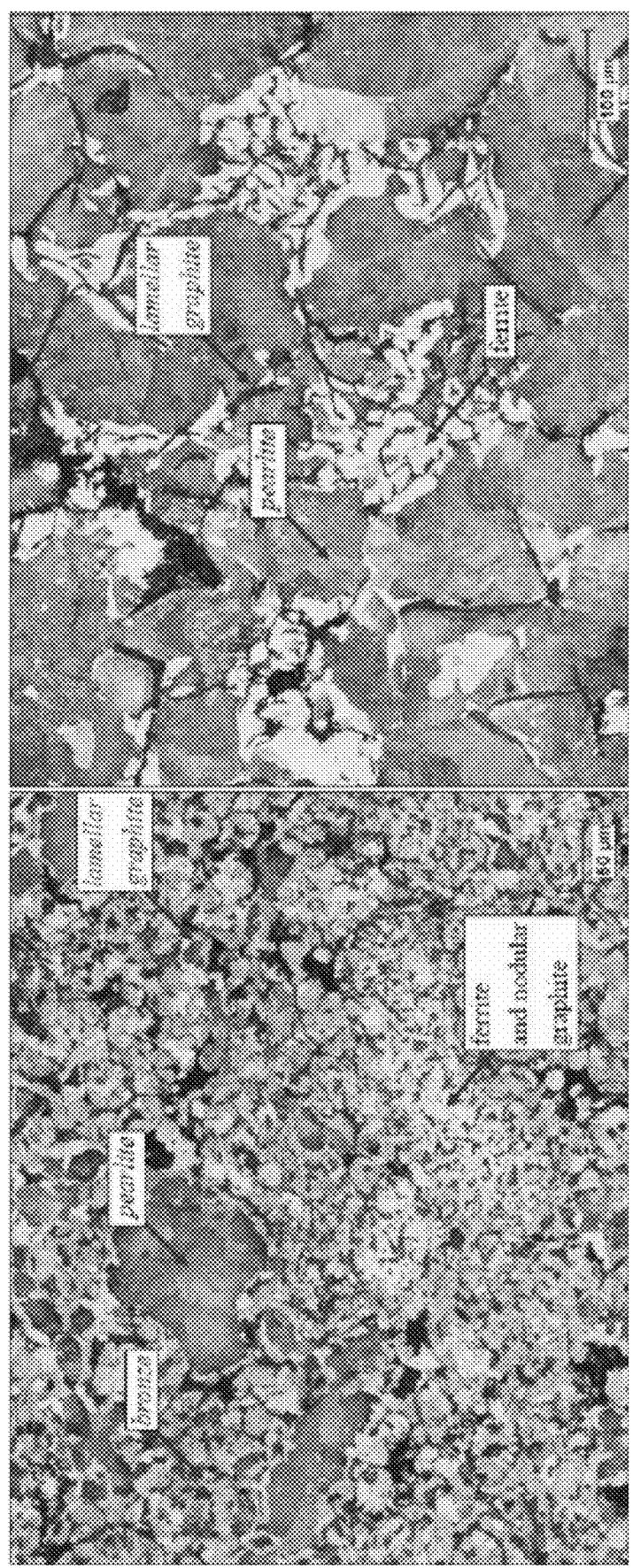

FIG. 20 shows the microstructure of two parts made of the same mix of powder metal materials that are made with at least 30 wt. % of a powder having a composition within Area #4, including 4.1 wt. % carbon, 1.5 wt. % silicon, and 5.0 wt. % tin. However, the parts were sintered under different conditions. The first part was made by solid state sintering, and the microstructure of the part, which is shown on the left, includes pearlite, lamellar graphite, ferrite and nodular graphite, and small islands of bronze (Cu—Sn). The second part was made by supersolidus liquid phase sintering, and the microstructure of the second part, which is shown in the right, includes pearlite, lamellar graphite, and ferrite.

Figure 21:
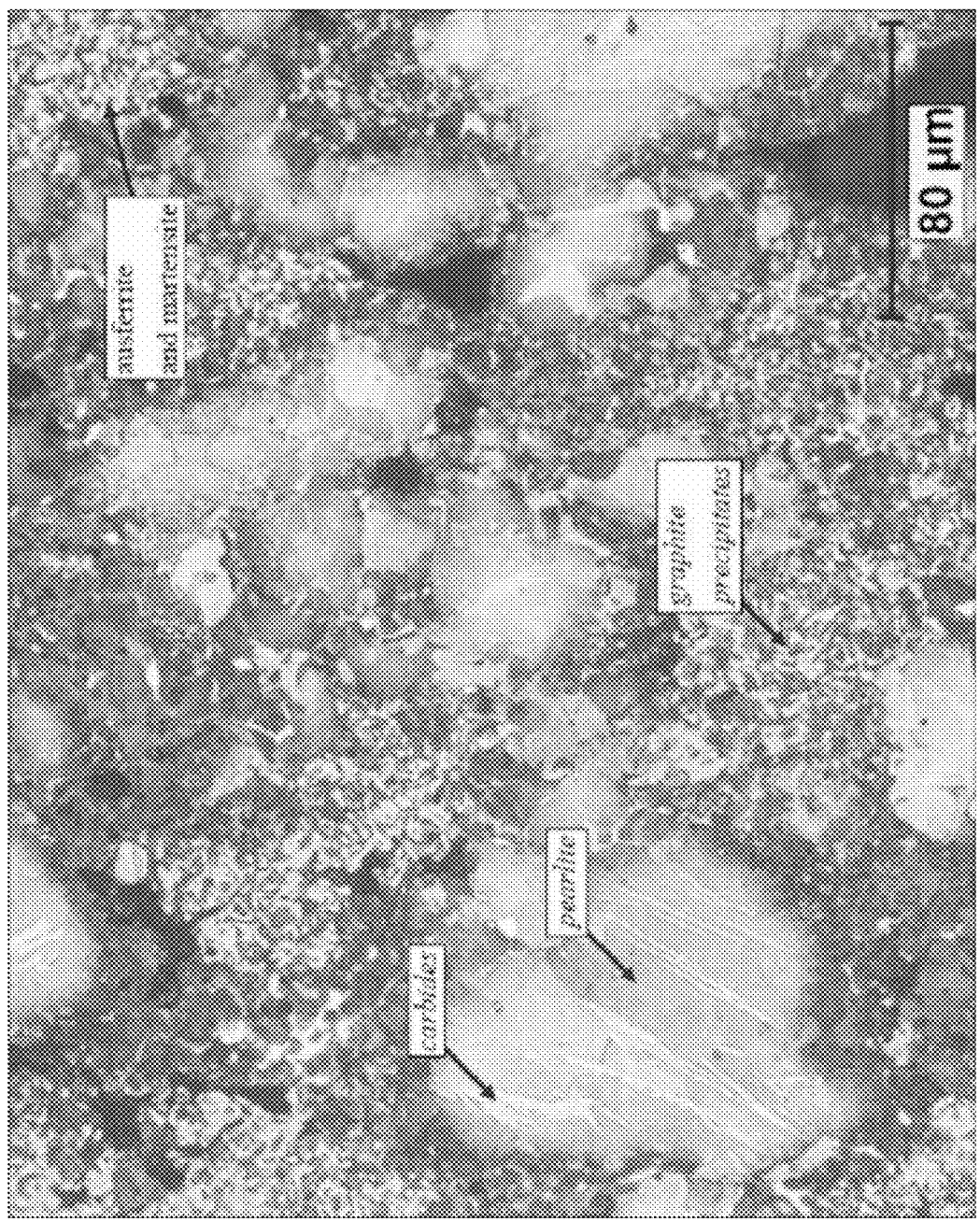

FIG. 21 shows the microstructure of a part after solid state sintering of a mixture that contains more than 40.0 wt. % of a powder metal material having a composition within Area #4, which includes 4.8 wt. % carbon, 0.7 wt. % silicon, 1.0 wt. % copper, and 0.36 wt. % molybdenum. The microstructure of FIG. 21 includes a mixture of pearlite, ausferrite, martensite, graphite precipitates, and carbides.

Figure 22:
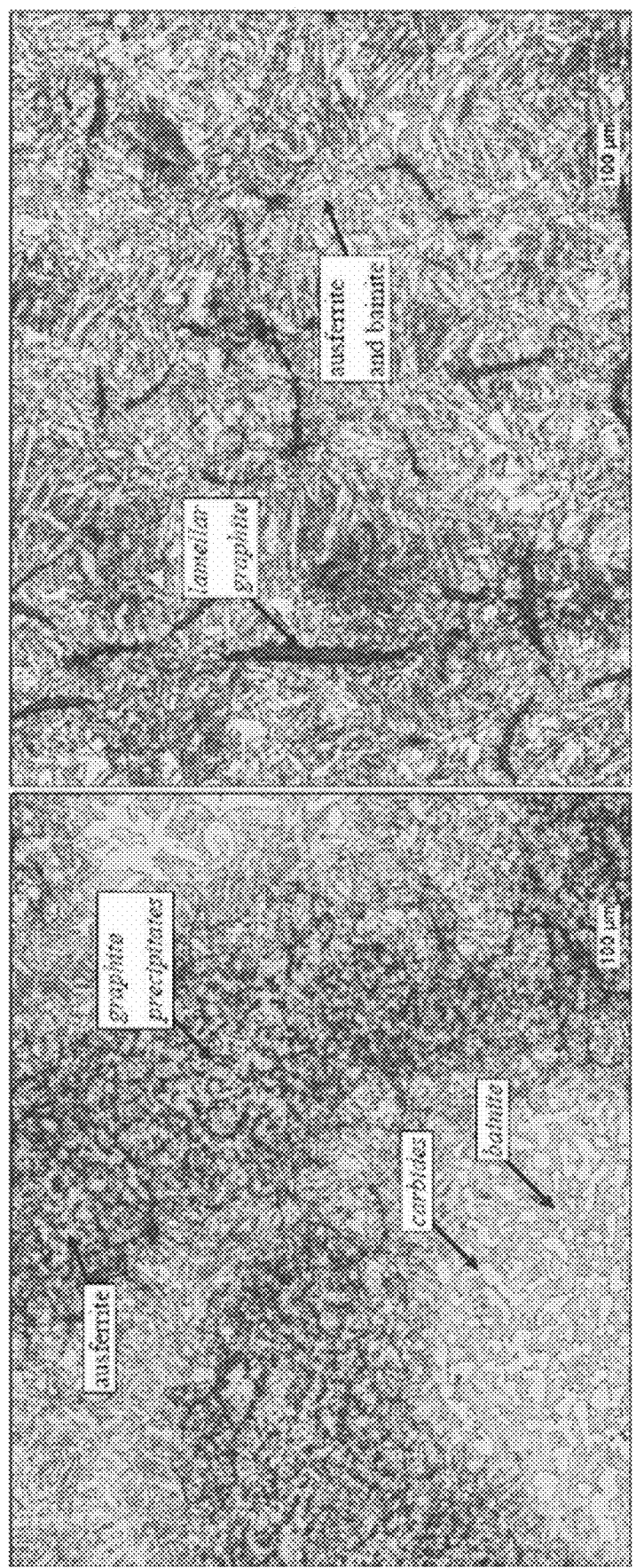

FIG. 22 shows the microstructures of two parts made of the same mixture of powder metal materials but sintered in different conditions. The mixture includes a powder metal material containing more than 50.0 wt. % of a powder metal material having a composition within Area #4, which includes 4.8 wt. % carbon, 0.7 wt. % silicon, 1.0 wt. % copper, and 0.36 wt. % molybdenum. The first part was made by solid state sintering, and the second part was made by supersolidus liquid phase sintering. The microstructure of the first part, which is shown on the left, includes a mixture of bainite, ausferrite, graphite precipitates, and carbides that contain molybdenum. The microstructure of the second part, which is shown on the right, includes a mixture of ausferrite, bainite, and lamellar graphite.

Figure 23:
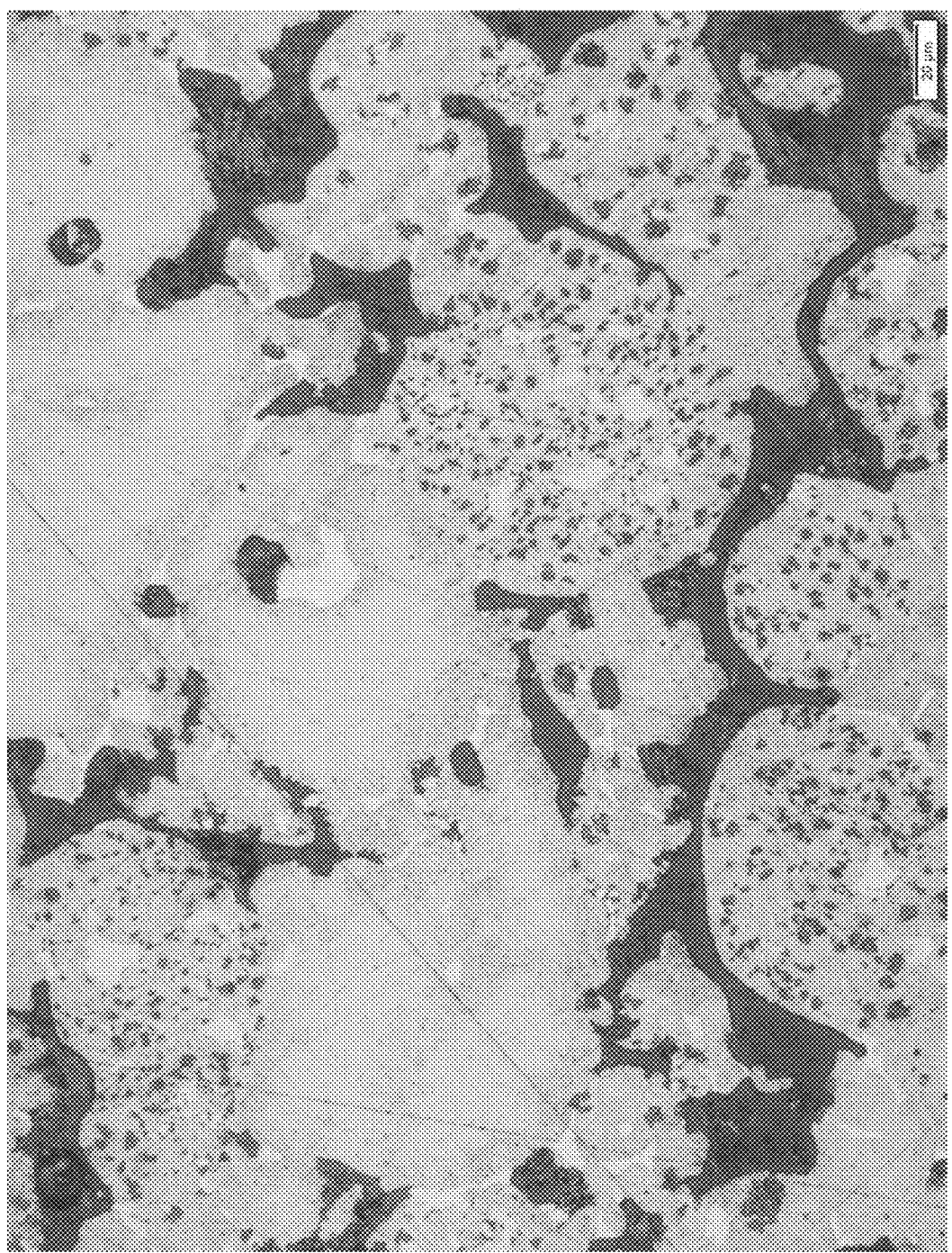

FIG. 23 show the microstructure of a part made with a mixture of more than 35.0 wt % of an as-atomized powder metal material having a composition within Area #4, which includes 3.0 wt. % carbon, 2.0 wt. % silicon, and more than 20 wt. % prealloyed copper. Nodular graphite precipitated inside the new powder metal material during sintering. The sintered microstructure is comprised of pearlite, free copper and nodular graphite.

As mentioned above, the powder metal material can be used to form a sintered part. The powder metal material can be used alone, or mixed with one or more other powder metal materials, including those within the scope of the invention and outside the scope of the invention. For example, the powder metal material can be mixed with unalloyed and/or alloyed steel. The powder metal material can also be used as an additive. In addition, powder metal materials according to different embodiments of the invention can be mixed together, creating particular conditions during sintering that give a control over the location and amount of liquid phase that can be formed. This also gives control over graphite morphology after sintering, which will influence the mechanical properties of the parts. According to another embodiment, the powder metal material is used as a carbon carrier in a powder mixture, which would lower the amount of ad-mixed graphite and thus reduce dusting.

Figure 24:
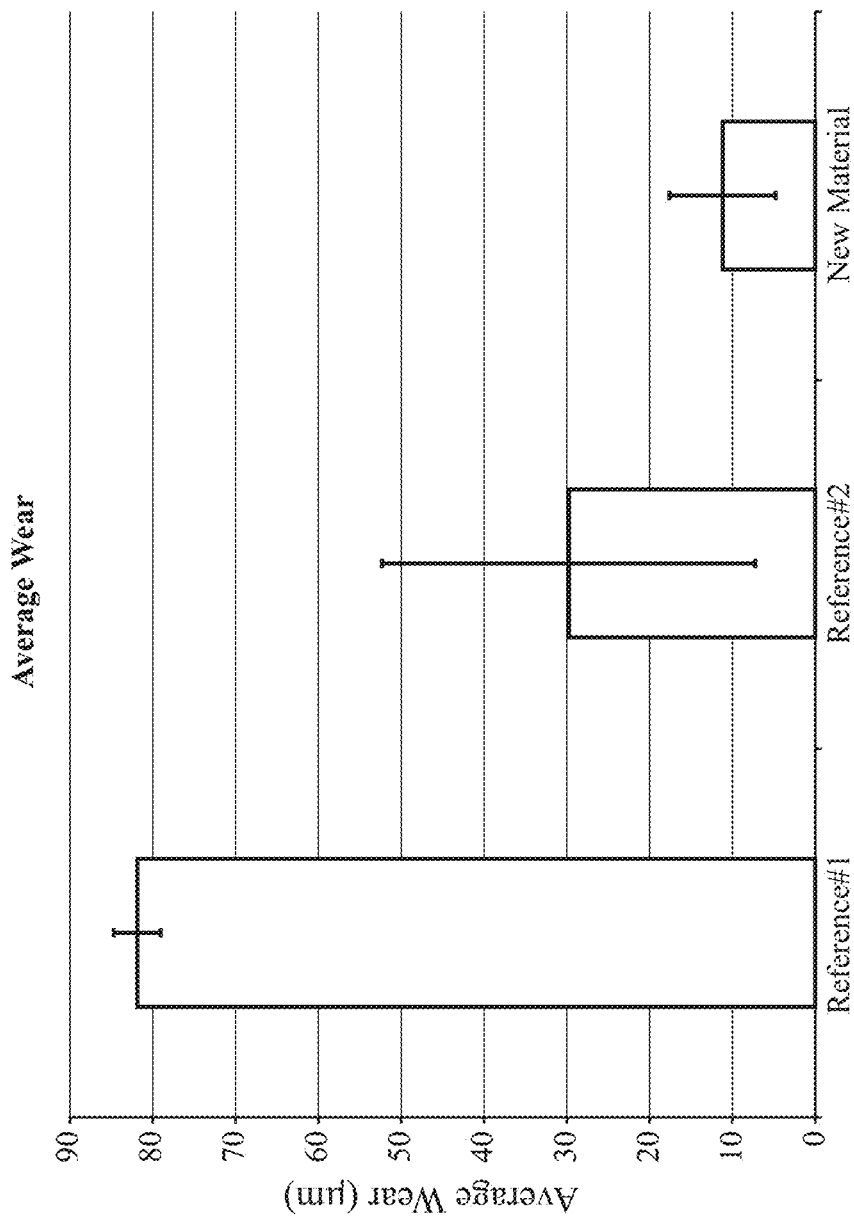
FIG. 24 illustrates wear test results showing parts formed of a powder metal material according to an example embodiment of the invention performed significantly better than reference materials.

According to one example embodiment, the powder metal material is sintered to form a valve guide part for an automotive vehicle. One important property that valve guide parts should have is the resistance to wear, since a lot of friction occurs between the valve and the valve guide during the life of the engine. An experiment was conducted to measure the wear resistance achieved by a valve guide made of more than 40.0 wt. % of a powder metal material containing free graphite according to an example embodiment of the invention. The parts were pressed and sintered in the solid state. The parts were then subjected to a rig test, which is a standard test done to evaluate wear of valve guides. The rig test was also done on two sets of parts each formed of a different reference material, which are commercially available valve guide materials. The wear average of the powder metal material according to the example embodiment was calculated using data from eight of the valve guide parts. FIG. 24 illustrates the average wear test results and shows that the parts formed of the powder metal material according to the example embodiment of the invention performed significantly better than the reference materials. The new material of this embodiment contains about 4% vol graphite after sintering.

Another aspect of the invention provides a method of manufacturing the powder metal material described above. The method typically includes water or gas atomizing a melt, but other atomizing methods can be used. The melt has one of the compositions described above, including carbon in an amount of at least 1.0 wt. % and up to 6.5 wt. %; and silicon in an amount of at least 0.1 wt. % and up to 6.0 wt. %, based on the total weight of the melt. The melt can also include various other alloying elements. In addition to iron (Fe), at least one of nickel (Ni) and cobalt (Co) are typically main constituents. Other possible alloying elements include at least one of copper (Cu), tin (Sn), aluminum (Al), sulfur (S), phosphorous (P), boron (B), nitrogen (N), chromium (Cr), manganese (Mn), molybdenum (Mo), vanadium (V), niobium (Nb), tungsten (W), titanium (Ti), tantalum (Ta) zirconium (Zr), zinc (Zn), strontium (Sr), calcium (Ca), barium (Ba) magnesium (Mg), lithium (Li), sodium (Na), and potassium (K). An overview of possible compositions of the melt is provided in the Table of FIG. 1.

After the atomization step, in some cases, at least some free graphite is present in the atomized particles. However, to increase the amount of free graphite, the method preferably includes heat treating the atomized particles. The specific temperature and conditions of the heat treatment process is adjusted depending on the chemical composition. During the heat treatment process, the free graphite precipitates and the amount of hard phases in the powders, for example carbides, decreases, thus increasing compressibility of the powder metal material.

The method can further include mixing the powder metal material with one or more other powder metal materials, which are either within the scope of the present invention, or outside the scope of the present invention.

The method also typically includes sintering the heat treated powder metal material to form a sintered part, such as a valve guide part for an automotive vehicle. The powder metal material can be sintered in the solid state or liquid state, for example by supersolidus liquid phase sintering.

Obviously, many modifications and variations of the present invention are possible in light of the above teachings and may be practiced otherwise than as specifically described while within the scope of the invention. It is contemplated that all features described and all embodiments can be combined with each other, so long as such combinations would not contradict one another.

The invention claimed is:

1. A material, comprising:
   a powder metal which is atomized,
   the powder metal including iron in an amount of at least 50 wt. %, based on the total weight of the powder metal,
   the powder metal including carbon (C) in an amount of 2.2 wt. % to 4.8 wt. %, copper (Cu) in an amount up to 4 wt. %, and silicon (Si) in an amount of 2.5 wt. % to 6.0 wt. %, based on the total weight of the powder metal,
   the powder metal including cobalt in an amount of at least 1 wt. % and/or tin in an amount of at least 0.5 wt. %, based on the total weight of the powder metal,
   the powder metal optionally including at least one of nickel (Ni), aluminum (Al), sulfur (S), phosphorous (P), boron (B), nitrogen (N), chromium (Cr), manganese (Mn), molybdenum (Mo), vanadium (V), niobium (Nb), tungsten (W), titanium (Ti), tantalum (Ta) zirconium (Zr), zinc (Zn), strontium (Sr), calcium (Ca), barium (Ba) magnesium (Mg), lithium (Li), sodium (Na), and potassium (K), and
   wherein the powder metal is heat treated and/or sintered, and the heat treated and/or sintered powder metal contains free graphite.

2. The material of claim 1, wherein the powder metal includes carbon in an amount of 2.2 wt. % to 4.3 wt. % and silicon (Si) in an amount of 2.5 wt. % to 4.5 wt. %, based on the total weight of the powder metal.

3. The material of claim 1, wherein the powder metal is sintered.

4. A material, comprising:
   a powder metal which is atomized and includes free graphite,
   the powder metal including iron in an amount of at least 50 wt. %, based on the total weight of the powder metal,
   the powder metal including carbon (C) in an amount of 5.0 wt. % to 6.5 wt. %, copper (Cu) in an amount up to 4 wt. %, and silicon (Si) in an amount of 0.1 wt. % to 6.0 wt. %, based on the total weight of the powder metal,
   the powder metal including cobalt in an amount of at least 1 wt. % and/or tin in an amount of at least 0.5 wt. %, based on the total weight of the powder metal,
   the powder metal optionally including at least one of nickel (Ni), aluminum (Al), sulfur (S), phosphorous (P), boron (B), nitrogen (N), chromium (Cr), manganese (Mn), molybdenum (Mo), vanadium (V), niobium (Nb), tungsten (W), titanium (Ti), tantalum (Ta) zirconium (Zr), zinc (Zn), strontium (Sr), calcium (Ca), barium (Ba) magnesium (Mg), lithium (Li), sodium (Na), and potassium (K).

5. The material of claim 4, wherein the powder metal includes carbon in an amount of 5.05 wt. % to 6.0 wt. % and silicon (Si) in an amount of 0.2 wt. % to 5.0 wt. %, based on the total weight of the powder metal.

6. A material, comprising:
   a powder metal which is atomized,
   the powder metal including iron in an amount of at least 50 wt. %, based on the total weight of the powder metal,
   the powder metal including carbon (C) in an amount of 5.0 wt. % to 6.5 wt. %, copper (Cu) in an amount up to 4 wt. %, and silicon (Si) in an amount of 0.1 wt. % to 6.0 wt. %, based on the total weight of the powder metal,
   the powder metal including cobalt in an amount of at least 1 wt. % and/or tin in an amount of at least 0.5 wt. %, based on the total weight of the powder metal,
   the powder metal optionally including at least one of nickel (Ni), aluminum (Al), sulfur (S), phosphorous (P), boron (B), nitrogen (N), chromium (Cr) in an amount not greater than 15 wt. %, manganese (Mn), molybdenum (Mo), vanadium (V), niobium (Nb), tungsten (W) in an amount of 0.5 to 4 wt. %, titanium (Ti), tantalum (Ta) zirconium (Zr), zinc (Zn), strontium (Sr), calcium (Ca), barium (Ba) magnesium (Mg), lithium (Li), sodium (Na), and potassium (K), wherein the powder metal is sintered, and
   the powder metal contains free graphite.

7. A material, comprising:
   a powder metal alloy which is atomized,
   the powder metal alloy including iron in an amount of at least 50 wt. %, based on the total weight of the powder metal alloy,
   the powder metal alloy including carbon (C) in an amount of 2.2 wt. % to 4.8 wt. %, silicon (Si) in an amount of 0.1 wt. % to 2.5 wt. %, and copper in an amount up to 4 wt. %, based on the total weight of the powder metal alloy,
   the powder metal alloy including cobalt in an amount of 1 wt. % to 46 wt. % and/or tin in an amount of 0.5 wt. % to 15 wt. %, based on the total weight of the powder metal alloy,
   the powder metal alloy optionally including at least one of nickel in an amount of 4.0 to 46 wt. %, aluminum in an amount of 0.1 to 10 wt. %, sulfur in an amount of 0.0.5 to 2.0 wt. %, phosphorous in an amount of 1.0 to 2.0 wt. %, boron in an amount of 0.20 to 1.0 wt. %, nitrogen in an amount of 0.05 to 1.0 wt. %, chromium in an amount of 2 to 15 wt. %, manganese in an amount of 2 to 25 wt. %, molybdenum in an amount of 4 to 10 wt. %, vanadium (V) in an amount of 0.1 to 10 wt. %, niobium (Nb) in an amount of 0.1 to 10 wt. %, tungsten (W) in an amount of 0.5 to 4 wt. %, titanium (Ti) in an amount of 0.1 to 10 wt. %, tantalum (Ta) in an amount of 0.1 to 10 wt. %, and/or zirconium (Zr) in an amount of 0.1 to 10 wt. %, based on the total weight of the powder metal alloy, and
   the powder metal alloy optionally including at least one of zinc (Zn), strontium (Sr), calcium (Ca), barium (Ba), magnesium (Mg), lithium (Li), sodium (Na), and potassium (K),
   wherein the powder metal alloy is heat treated and/or sintered, and the heat treated and/or sintered powder metal alloy contains free graphite.

8. A material, comprising:
   a powder metal alloy which is atomized,
   the powder metal alloy including iron in an amount of at least 50 wt. %, based on the total weight of the powder metal alloy,
   the powder metal alloy including copper in an amount up to 4 wt. % or in an amount of 5 to 30 wt. %, based on the total weight of the powder metal alloy,
   the powder metal alloy including cobalt in an amount of 1 wt. % to 46 wt. % and/or tin in an amount of 0.5 wt. % to 15 wt. %, based on the total weight of the powder metal alloy,
   wherein the powder metal alloy includes carbon (C) in an amount of 2.2 wt. % to 4.8 wt. %, silicon (Si) in an amount of 0.5 wt. % to 2.5 wt. %, and at least one of the following: nickel in an amount of 4 to 35 wt. %, cobalt in an amount of 1 to 35 wt. %, tin in an amount of 0.5 to 10 wt. %, aluminum in an amount of 0.5 to 8 wt. %, sulfur in an amount of 0.1 to 1.5 wt. %, phosphorous in an amount of 1.0 to 1.5 wt. %, boron in an amount of 0.20 to 0.4 wt. %, nitrogen in an amount of 0.05 to 0.6 wt. %, chromium in an amount of 3 to 15 wt. %, manganese in an amount of 3 to 15 wt. %, molybdenum in an amount of 4 to 8 wt. %, vanadium (V) in an amount of 0.5 to 8 wt. %, niobium (Nb) in an amount of 0.5 to 8 wt. %, tungsten (W) in an amount of 0.5 to 15 wt. %, titanium (Ti) in an amount of 0.5 to 8 wt. %, tantalum (Ta) in an amount of 0.5 to 8 wt. %, and zirconium (Zr) in an amount of 0.5 to 8 wt. %, based on the total weight of the powder metal alloy, and the powder metal alloy optionally including at least one of zinc (Zn), strontium (Sr), calcium (Ca), barium (Ba), magnesium (Mg), lithium (Li), sodium (Na), and potassium (K), wherein the powder metal alloy is heat treated and/or sintered, and the powder metal alloy contains free graphite.

9. The material of claim 7, wherein the powder metal alloy is sintered.

10. The material of claim 4, wherein the powder metal is heat treated and/or sintered, and the heat treated and/or sintered powder metal contains free graphite.

11. A material, comprising:

a powder metal which is atomized, the powder metal including iron in an amount of at least 50 wt. %, based on the total weight of the powder metal, the powder metal including carbon (C) in an amount of 5.0 wt. % to 6.5 wt. %, copper (Cu) in an amount up to 4 wt. %, and silicon (Si) in an amount of 0.1 wt. % to 6.0 wt. %, based on the total weight of the powder metal, the powder metal including cobalt in an amount of at least 1 wt. % and/or tin in an amount of at least 0.5 wt. %, based on the total weight of the powder metal, the powder metal optionally including at least one of nickel (Ni), aluminum (Al), sulfur (S), phosphorous (P), boron (B), nitrogen (N), chromium (Cr), manganese (Mn), molybdenum (Mo), vanadium (V), niobium (Nb), tungsten (W), titanium (Ti), tantalum (Ta) zirconium (Zr), zinc (Zn), strontium (Sr), calcium (Ca), barium (Ba) magnesium (Mg), lithium (Li), sodium (Na), and potassium (K), wherein the powder metal is heat treated and/or sintered, and the heat treated and/or sintered powder metal contains free graphite.

* * * * *